US009442308B2

United States Patent
Dai

(10) Patent No.: US 9,442,308 B2
(45) Date of Patent: Sep. 13, 2016

(54) MULTI-ELEMENT LENS OF CONTROLLING DEFOCUS AND EYE DIOPTER AND APPLICATION THEREOF

(76) Inventor: Minghua Dai, Shijiazhuang (CN)

( * ) Notice: Subject to any disclaimer, the term of this patent is extended or adjusted under 35 U.S.C. 154(b) by 113 days.

(21) Appl. No.: 14/407,894

(22) PCT Filed: Jun. 27, 2012

(86) PCT No.: PCT/CN2012/000882
§ 371 (c)(1),
(2), (4) Date: Feb. 2, 2015

(87) PCT Pub. No.: WO2013/185263
PCT Pub. Date: Dec. 19, 2013

(65) Prior Publication Data
US 2015/0160477 A1    Jun. 11, 2015

(30) Foreign Application Priority Data

Jun. 15, 2012  (CN) .......................... 2012 1 0196959

(51) Int. Cl.
*G02C 7/06*    (2006.01)
*G02C 7/04*    (2006.01)

(52) U.S. Cl.
CPC ................. *G02C 7/06* (2013.01); *G02C 7/061* (2013.01); *G02C 7/044* (2013.01); *G02C 7/066* (2013.01); *G02C 2202/24* (2013.01)

(58) Field of Classification Search
CPC ........ G02C 7/04; G02C 7/041; G02C 7/042; G02C 7/044; G02C 7/06; G02C 7/061; G02C 7/063; G02C 7/066; G02C 2202/24
USPC ............ 351/159.41, 159.43, 159.42, 159.78, 351/159.79
See application file for complete search history.

(56) References Cited

U.S. PATENT DOCUMENTS

| 2007/0296916 | A1* | 12/2007 | Holden ................. G02C 7/042 351/159.08 |
| 2009/0040459 | A1  | 2/2009  | Dai et al. |
| 2010/0036489 | A1* | 2/2010  | Lindacher ............. G02C 7/028 623/6.27 |
| 2010/0296058 | A1* | 11/2010 | Ho ....................... A61B 3/0025 351/246 |

(Continued)

FOREIGN PATENT DOCUMENTS

| CN | 2451083 Y | 10/2001 |
| CN | 1645188 A | 7/2005 |

(Continued)

*Primary Examiner* — Bumsuk Won
*Assistant Examiner* — William R Alexander
(74) *Attorney, Agent, or Firm* — Christensen Fonder P.A.

(57) ABSTRACT

A multi-element lens for controlling defocus and eye diopter for prevention and treatment of myopia and hyperopia. The multi-element lens includes one large unit convex lens for generating large defocus. One small unit concave lens for generating small defocus or focus through combination is combined on the lens of the large unit convex lens, or one small single lens is separately provided on the large unit convex lens. When an eye watches different distances through the lens, the central view region is in a small nearsightedness defocus or focus state, or a small farsightedness defocus or focus state, whereas the equatorial view region is always in a nearsightedness or farsightedness defocus state. Through the special influences of light on the view regions of human eyes, the growth of the ocular axis can be effectively controlled, which achieves the characteristics of good and fast prevention and treatment of myopia and hyperopia.

7 Claims, 1 Drawing Sheet

(56) References Cited

U.S. PATENT DOCUMENTS

| | | | |
|---|---|---|---|
| 2011/0051079 A1* | 3/2011 | Martinez | G02C 7/02 351/159.34 |
| 2011/0085129 A1* | 4/2011 | Legerton | G02C 7/04 351/159.16 |
| 2011/0317128 A1* | 12/2011 | Guilloux | G02C 7/025 351/246 |
| 2012/0194780 A1* | 8/2012 | Back | G02C 7/041 351/159.73 |
| 2014/0211147 A1* | 7/2014 | Wei | G02C 7/04 351/159.06 |
| 2014/0347622 A1* | 11/2014 | Wu | G02C 7/044 351/159.13 |
| 2015/0085247 A1* | 3/2015 | Holden | G02C 7/041 351/159.06 |

FOREIGN PATENT DOCUMENTS

| | | |
|---|---|---|
| CN | 1827068 A | 9/2006 |
| CN | 101467092 A | 6/2009 |
| CN | 102119354 A | 7/2011 |

* cited by examiner

MULTI-ELEMENT LENS OF CONTROLLING DEFOCUS AND EYE DIOPTER AND APPLICATION THEREOF

PRIORITY CLAIM

The present application is a National Phase entry of PCT Application No. PCT/CN2012/000882, filed Jun. 27, 2012, which claims priority to Chinese Patent Application No. 201210196959.8, filed Jun. 15, 2012, the disclosures of which are hereby incorporated by reference herein in their entirety.

TECHNICAL FIELD

The present invention relates to the technical field of glasses preventing and treating myopia and hyperopia of eyes.

BACKGROUND ART

The inventor of the present invention owns Chinese patent entitled "Myopia Preventing and Treating Device for Close-Defocusing Vision Training and Application Method Thereof" (Chinese patent number: ZL200410098856.3). However, when this application describes application of a defocus method to treat myopia, it does not distinguish the central view region, equatorial view region and other peripheral view regions of human eyes, does not consider far-defocusing vision and does not involve the treatment and prevention of hyperopia. Its scope of application is limited to some extent and its application effect is not ideal.

SUMMARY OF THE INVENTION

The object of the present invention is to provide a multi-element lens for controlling defocus and eye diopter and application thereof for eyes. The present invention divides the lens into a lens area corresponding to the central view region of eye and a convex lens area corresponding to the equatorial view region of eye, generates specific optical action to eye retina, can effectively improve eye diopter, regulate and control the axis length of eyes and ensure normal growth of ocular structure. The present invention is characterized by good, fast and stable effects in prevention and treatment of myopia and hyperopia, and convenient use. It is particularly suitable for treatment of juvenile myopia and hyperopia and for prevention of myopia.

One part of the present invention is realized in the following way:

A multi-element lens of controlling defocus and eye diopter, wherein it comprises a large unit convex lens generating large defocus, a small unit concave lens for generating small defocus or focus through combination is combined on the lens of the large unit convex lens, or a small single lens for generating small defocus or focus is separately provided on the lens of the large unit convex lens.

The diopter of the large unit convex lens conforms to the following formula M:

$\Phi_L = 1/U + B_L$ mainly corresponding to the equatorial view region of eye, where: the unit of $\Phi_L$ ($\Phi_{Large}$) is D; U is the distance from the lens to the object, U≥0.15, and its unit is m; $B_L$ ($B_{Large}$) is large defocus degree, its unit is D and $0 < B_L \le 20$ OD;

The diopter after combination of the large unit convex lens and the small unit concave lens or the diopter of the small single lens conforms to the following formula N:

$\Phi_{P-CS}$ or $\Phi_{SS} = 1/U + A + B_S$, corresponding to the central view region of eye or the peripheral view region around the central view region, wherein, the unit of $\Phi_{P-CS}$ ($\Phi_{Post-combine\ small}$) or $\Phi_{SS}$ ($\Phi_{Single\ small}$) is D; U is the same as the above; A is the diopter of eye when the subject looks far; $B_S$ ($B_{Small}$) is small defocus degree and its unit is D;

a. In Formula N: A is fully corrected diopter when a myope looks far, and is a negative value; for a myope, $0 \le B_S \le 0.75D$. It is used to treat myopia.

The so-called "fully corrected diopter" means the diopter for glasses dispensing when the vision is corrected to the best value (such as 1.5 or 2.0) when the person looks at a 5 m standard visual chart (The meaning is the same thereinafter. It will not be stated again).

b. Or, in formula N, A is fully corrected diopter when a hyperope looks far, and is a positive value; for a hyperope, $0 \ge B_S \ge -0.75D$. It is used to treat hyperopia.

c. Or, in formula N, A is the normal diopter value when the subject looks far; for a subject needing myopia prophylaxis, $0 \le B_S \le 0.75D$. It is used to prevent myopia.

On the large unit convex lens, a subunit concave lens capable of generating medium defocus through combination with the lens of the large unit convex lens is also provided, or preferably a medium single lens capable of generating medium defocus is provided. The diopter after combination of the large unit convex lens and the subunit concave lens or the diopter of the medium single lens conforms to the following Formula P:

$\Phi_{P-CM}$ or $\phi_{SM} = 1/U + A + B_M$, corresponding to the peripheral view region of the eye except the equatorial view region, wherein, the unit of $\Phi_{P-CM}$ ($\Phi_{Post-combine\ medium}$) or $\Phi_{SM}$ ($\Phi_{Single\ medium}$) is D; U is same as the above; A is the diopter when the subject needing prophylaxis and treatment looks far, and $B_M$ ($B_{Medium}$) is a medium defocus degree;

a. In Formula P: A is fully corrected diopter when a myope looks far, and is a negative value; $0.75D < B_M \le 20D$:

b. Or, in Formula P, A is fully corrected diopter when a hyperope looks far, and is a positive value; $-0.75D > B_M \ge -20D$; it is used to treat hyperopia.

c. Or, in Formula P, A is the normal diopter value when the subject needing prophylaxis looks far; $0.75D < B_M \le 20D$. It is used to prevent myopia.

The distance U from the aforesaid lens to the object may be set as 5 m, or 0.5 m, or 0.33 m, and made into three common standards to simplify standard and facilitate application (the effect is good).

Preferably, the junction between the large unit convex lens and the small unit concave lens or the small single lens is a gradual zoom structure or step zoom structure, as will result in good effect.

The subunit concave lens or the medium single lens is disposed on the outer ring of the small unit concave lens or the small single lens and is ring-like (one ring or a plurality of rings). Preferably, there are more than two encircling the outer ring of the small unit concave lens or the small single lens, as will result in good effect.

Preferably, the junctions between the small unit concave lens or the small single lens, the subunit concave lens or the medium single lens and the large unit convex lens are gradual zoom structure or step zoom structure, as will result in good effect. Transitional conversion conforms to the structural need of eyes, may make eyes feel more comfortable and is more convenient for daily wearing, popularization and application, such that the effect is even better.

Another part of the present invention is realized in the following way:

Application of the aforesaid multi-element lens for controlling defocus and eye diopter, wherein it is used in the ocular of a Galileo telescope, frame-type glasses, contact lens, clip-type hang glasses, therapeutic glasses (device), desktop read-write glasses, ocular of a reading telescope (such as: the reading telescope described in the patent document with a Chinese patent number: ZL00253081.3), table-mounted mirror or glasses with a controllable sight distance, or the ocular of a Galileo telescope which is used to substitute the ocular of a reading telescope.

The theoretical and experimental basis of the present invention:

The human eye is an organ adaptable to light. The evolution of the human eye is earlier than the human brain. The genes closely related to the human eye are pax6, RX, Eya, Eya2 and so on. The interaction between normal genetic genes and a normal external environment (mainly the factor of light) determines the normal development and change of eyes. Although genes are the basis of eye development, environmental factors decide whether eyes can develop normally. For the human eye, which is an organ closely related to light, after a baby leaves its mother's body, the normal development of the eyes with normal genes depends on the external factor of light. Non-benign photo-stimulation may result in abnormal development of eyes (for example: amblyopia and hyperopia caused by poor development, and myopia caused by abnormal development). Therefore, the external factor of light is the root cause of the occurrence and development of many eye diseases. The external factors of acquired myopia, hyperopia, astigmia and amblyopia all have a direct relation with light. Therefore, theoretically speaking, correction of personal behaviors and creation of a good light environment may avoid unhealthy light influence and improve, prevent and control the occurrence and development of the above eye problems. The specially designed optical invention herein may effectively prevent and control myopia, hyperopia, astigmia and amblyopia.

As early as last century, Shmid and Schaeffe successfully and artificially created hyperopia and myopia of animals by an optical method: to do animal eye defocusing experiments by using convex lenses and concave lenses. The result revealed that the formation of hyperopia and myopia only had a relation with light and had nothing to do with other external factors. When an optical method is used to create a hyperopic defocus of an eye, the eye will be of a myopic structure and even highly myopic structure may be achieved. Likewise, myopic defocus may create hyperopia of animals. Xiaosong Zhu from the Peking University Health Science Center, China, did an animal experiment in 1992 which further proved the region affecting excessive lengthening of ocular axis is in the rear half of the eyeball, the equator in particular (i.e., the equatorial view region in the peripheral view region of eye). Therefore, influencing this region by optical method may control the extension of the ocular structure in this region, thus regulate and control the growth of ocular axis. By early this century, many domestic and foreign universities and scientific research institutions had done a lot of related experiments and issued many papers. They all proved intervening animal eyes by optical method to create eye defocus may control eye diopter of myopia and hyperopia. However, when it was applied among students, due to people's subjective initiative, when defocus is artificially created, for example, creating myopic defocus by wearing convex lens or creating hyperopic defocus by wearing concave lens, people always manage to look at things clearly through adjusting distance, as a result, it is difficult to maintain defocus in real life and the therapeutic effect is affected, and all of the subsequent experiments are not ideal. "Myopia preventing and treating device for close-defocusing vision training and application method thereof" (Chinese patent number: ZL200410098856.3) and "anti-myopia apparatus for reading and writing" (Chinese patent number: ZL200510048264.5) invented by the same inventors have been applied for many years, and have directly proved: by changing the distribution degree of light through a lens and then changing the optical properties of the light inside an eyeball strictly according to the actual diopter of the eye, favorable defocus can be achieved, then the central visual region and peripheral visual region inside the eyeball are influenced, and thus the development of eye myopia is influenced. The application of the above two patents has produced certain effect. These lay an experimental foundation for the present invention.

Design idea and prevention and control mechanism of the technical solution of the present invention:

According to the method of optical defocus, a lens for intervening with human eyes is designed. As shown in FIG. 9, the whole retina region inside a human eye, i.e., the whole view region, may be divided into a central view region 03 (it is larger than the central visual field), an equatorial view region 01 (i.e., the peripheral view region near the equator, including the far end; the equator of the equatorial view region inside the eyeball corresponds to the equator outside the eyeball) and partial peripheral view region 02 between these two view regions. Central visual field decides clear vision of human eye, while the equatorial view region has extremely small influence on clear vision of the human eye, but the eye growth and change in this region has the most significant effect on the size of ocular axis. For this reason, the invention uses the method of optical defocus to design such a multi-element lens, for interventional prevention and treatment of myopia and hyperopia of eyes. Different optical intervention is conducted to the three regions. For the equatorial view region, in particular, the large defocus generated by optical large unit convex lens $\Phi_L$ is used to control the enlargement of this region, thus further control unfavorable change of ocular axis. The diopter $\Phi_{Small}$ of the small single lens corresponding to the central view region may generate focus or small defocus to satisfy visual need and assure certain control action, and is adapted to the characteristics of eyeballs (such as for the eyeball of a myopic eye, the structure of its central view region becomes abnormal and this region tends to be flattened). For partial peripheral view region between these two regions, the intervention of medium defocus or transitional defocus plays a role of gradual control, and conforms to the characteristics of this part of the eyeball (this region has a part with a curved surface having large curvature). The equatorial view region inside the eyeball, particularly the far end farthest from the central visual field, is closest to the anterior pole of the eye; the length from this part to the anterior pole of the eye is relatively stable and less affected by the lengthening of ocular axis during myopization, therefore, the diopter of the large unit lens corresponding to the equatorial view region is: $\Phi_L = 1/U + B_L$. The aforementioned formula does not contain A, and the value of $B_L$ is positive to ensure that no matter how U changes, the sum of $1/U$ and $B_L$ may find a due defocus at this region in combination with the refractive power of the eye. Further, when the value of $B_L$ is large, its influence on human vision is small. When one or a plurality of rings are selected for the diopter $\Phi_{Medium}$ of the medium single lens corresponding to partial peripheral view region, the value of defocus degree $B_L$ will also decrease with the approach of the rings to the central region. All in all, as far as the whole visual field is concerned, the values of $B_L$, $B_M$ and $B_S$ decrease in turn in general, and $\Phi_L$ generates the largest defocus effect, so $B_L$ is called as large defocus degree. Likewise, there are the concepts of medium defocus degree and small defocus degree. They will not be explained one by one here. The defocus is designed from large to small, corresponding to the equatorial view region, the partial peripheral view region and the central view region inside the eyeball, respectively. In addition to ensuring that clear vision is generated in the central visual field, the significance further lies in conformity to the special physiological structure rule of the approximately spherical concave surface of the specific visual field of eyeball, for gradual and appropriate defocus intervention, thus achieving a good prevention and treatment effect.

According to the above theory, for eyes of juveniles, hyperopic defocus plays a significant role in the growth and enlargement of the rear part of the eyeball. Particularly, the equator has the greatest effect on ocular axis. The growth of this part significantly influences the growth of ocular axis, thus forming axial myopia. After formation of myopia, the regulating ability and functional compensation of the eyeball will make the total refractive power of the eye decrease. The said total refractive power raises the degree of hyperopic defocus in the equator of the eyeball, so it further promotes the growth of this part and continues to lengthen ocular axis. It is one of the important reasons why the myopia of a myope is more easily developed. When an eye looks near, the sighting target is normally a near plane. The rear part of the eyeball generates dynamic hyperopic defocus. Particularly, the defocus in the equator is the largest. It is another important reason for occurrence and development of myopia. Therefore, the equator should be subjected to optical myopic defocus. For this reason, a convex lens is designed as the part of a large unit lens for the eye, ensuring that, whenever the eye looks near or far, the equatorial view region of the eye is always in an optical myopic defocus state after the diopter of the lens is combined with the adjusted total refractive power of the eye, thus achieving an optimum myopia prevention and treatment effect through controlling the growth of ocular axis.

According to the above theory, for the hyperopia of children whose eyes are still in development and the hyperopia of the eyes which have stopped development, usually the total refractive power of eyeball is small, the ocular axis is short, and thus the rear semisphere of the eyeball is in a hyperopic defocus state. Naturally, the rear part of the eyeball will be enlarged, resulting in emmetropization. In order to prevent and treat amblyopia and improve vision, vision correction with convex lens must be adopted, but in order to ensure full correction or non-excessive correction of hyperopia, we design small defocus or focus for the central view region of the eye, large defocus of convex lens with a degree smaller than the correction degree for the equatorial view region and medium defocus for other peripheral view regions, to create such optical hyperopic defocus. When a hyperopic eye looks near, the rear semisphere of the eyeball is also in dynamic hyperopic defocus. In general, when it looks near, the hyperopic defocus in the peripheral view region, particularly in the equator, is larger than that in the central view region, so the eye is inclined to be myopia. However, as the regulating power of the hyperopic eye is insufficient, it is more likely to become tired when the eye looks near. Therefore, the lens for near vision designed according to the above principle may solve the problem of insufficient regulation and meanwhile, an optimum hyperopia prevention and treatment effect may be achieved through promoting the growth of ocular axis.

In order to ensure the retina of the human eye achieves the due defocus effect when it looks into different distances, and reduce eye regulation and relieve eye fatigue when it looks near for a long time, lenses for various visual distance may be designed. On this ground, lenses for far, medium and near vision with normal distances of about 5 m, 0.5 m and 0.33 m are designed to satisfy the need and defocus effect (i.e., not less than 5 m when looking far, about 0.5 m when looking into medium distance, and about 0.33 m or even shorter when looking near) when the eyes look into a specific distance for a long time. The lens for far vision for prevention and treatment of myopia may be worn around the clock and may also be used to look near. The myope who does not often look into medium or short distance, does not need to wear a lens for medium or near vision. If the myope often looks near, for example, looking into a distance of about 0.5 m or 0.33 m for a long time, the ciliary muscle of eyes cannot relax, resulting in eye fatigue due to excessive adjustment of eyes, thus, a lens exclusively for medium or near vision may be worn. It has a better effect in relieving the fatigue from eye adjustment. An hyperope usually does not need to wear a lens for medium or near vision (looking near will naturally lead to emmetropia), but if it is difficult to look near or liable to fatigue when look near, lens for near vision may be needed. People in prophylaxis of myopia don't need to use lenses for far vision (because normal eyes won't become myopic when they look far). If hyperopia is around or below +1.00 for children aged 10~8, or around or below +1.50D for children aged 8~6, hyperopia prevention and treatment are not needed (with the growth of age, they will naturally become emmetropic). Teenagers and children within +0.25D~−0.25D need myopia prevention. In order that human eyes can achieve the above defocus and effect by wearing glasses no matter how far they look, and for the need of lens preparation, calculation and expression, we use defocus formula $\Phi_L=1/U+B_L$ to mainly correspond to the equatorial view region of eye. $\Phi_{P\text{-}CS}$ or $\Phi_{SS}=1/U+A+B_S$ corresponds to the central view region and the peripheral view region around the central view region. $\Phi_{P\text{-}CM}$ or $\Phi_{SM}=1/U+A+B_M$ corresponds to the peripheral view region of eye except the equatorial view region.

Compared to the prior art, the positive effect of the present invention is significant. The present invention divides the lens into a visual area corresponding to the central view region of eye and a visual area corresponding to the equatorial view region of eye. The diopter of two or more parts generates specific optical effect on eye retina and can effectively regulate and control the change of ocular axis, improve eye diopter and regulate and control normal development of ocular structure, thus achieving the goal of preventing and treating myopia and hyperopia and improving vision. Theory and practice have proved the present invention achieves the characteristics of good, fast and stable prevention and treatment of myopia and hyperopia, and the present invention is convenient in use, may make eyes more comfortable and is more convenient for daily wear, popularization and application. It is particularly suitable for treatment of juvenile myopia and hyperopia, and prevention of myopia.

Below the present invention is described in details with reference to embodiments and accompanying drawings, which do not intend to limit the present invention.

BRIEF DESCRIPTION OF THE DRAWINGS

In FIG. 1 to FIG. 8, the meaning of each reference number is: 1—large unit convex lens, 2—small unit concave lens, 3—small single lens, 4—subunit concave lens, 5—medium single lens, 6—a plurality of subunit concave lenses;

In FIG. 9, 01—equatorial view region, 02—partial peripheral view region, 03—central view region.

DETAILED DESCRIPTION

The lenses in the following embodiments are all prepared and fitted according to the formulae and collocation described above and will not be described again.

Figure 1:
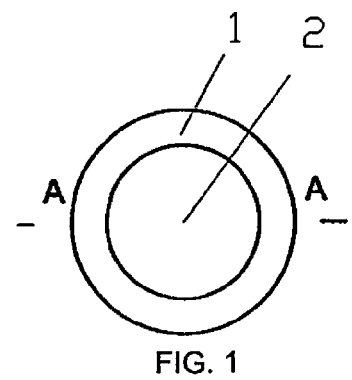
FIG. 1 is a structural schematic diagram of Embodiment 1 of the glasses according to the present invention.
Figure 2:
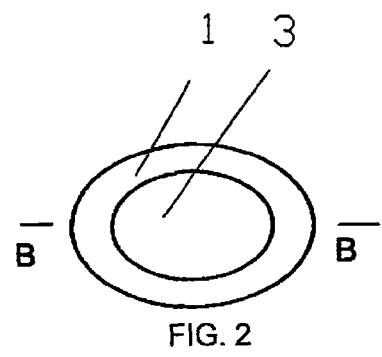
FIG. 2 is a structural schematic diagram of Embodiment 2 of the glasses according to the present invention.
Figure 3:
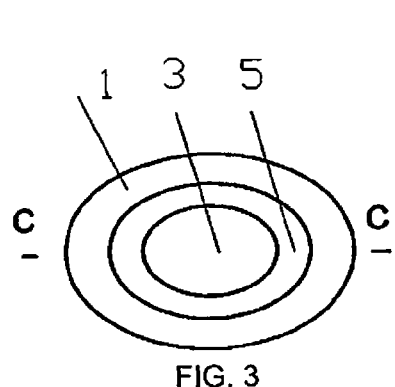
FIG. 3 is a structural schematic diagram of Embodiment 3 of the glasses according to the present invention.
Figure 4:
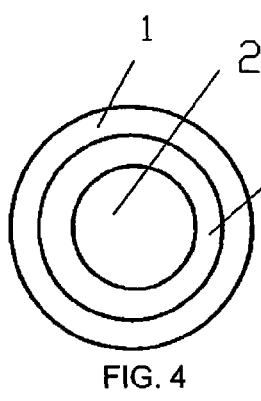
FIG. 4 is a structural schematic diagram of Embodiment 4 of the glasses according to the present invention.
Figure 5:
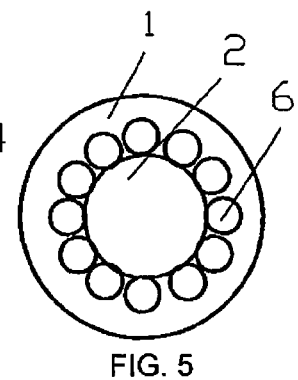
FIG. 5 is a structural schematic diagram of Embodiment 5 of the glasses according to the present invention (encircled by a plurality of subunit concave lenses).
Figure 6:
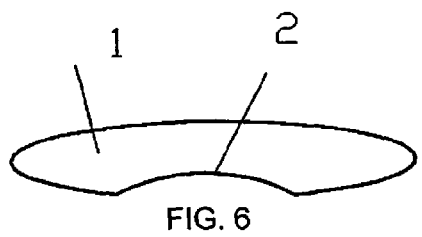
FIG. 6 is A-A cross-section of FIG. 1.
Figure 7:
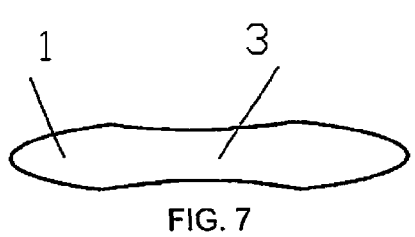
FIG. 7 is B-B cross-section of FIG. 2.
Figure 8:
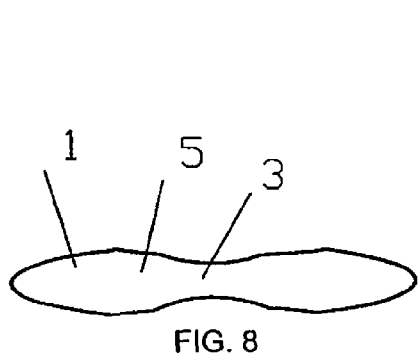
FIG. 8 is C-C cross-section of FIG. 3.
Figure 9:
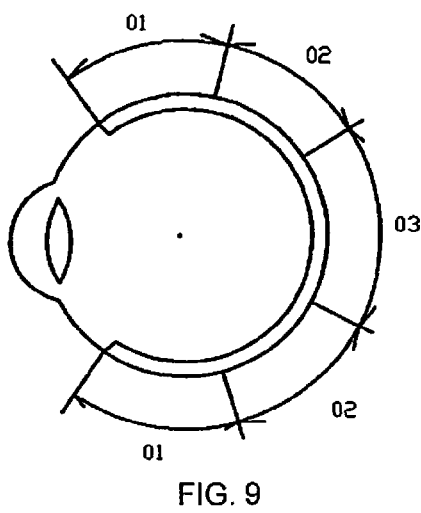
FIG. 9 is a schematic diagram of the structure of human eye and view region distribution.

FIG. 1 to FIG. 8 show the structures of the lenses used by the embodiments. They all have a good effect. The structures shown in FIG. 1 and FIG. 2 are the commonly used and most basic structural forms.

Below the embodiments and application effects of the lenses are described.

I. Result of Clinical Experiment:

(I). Experimental Population

Selecting 1100 primary and secondary school students of ages 6~16, 11.5 on average, as the experimental population, including 798 myopes, 102 hyperopes and 200 subjects needing prophylaxis of myopia.

(II). Experimental Approach

① Method of fitting glasses: glasses are fitted according to the formula on the basis of the actual diopter and common sight distance of subject's eyes; if he looks far (including a distance of not less than 5 m and infinite distance) and looks near (20 cm~5 m) in normal life, value U is calculated as 5 m and a pair of general-purpose glasses for far vision are fitted to meet the requirements. When the time spent in doing homework and reading books is long and eyes are liable to fatigue, value U is calculated as 33 cm and a pair of special-purpose glasses for near vision are fitted to meet the requirements. When the subject spends a long time operating a computer and surfing on the Internet and eyes are liable to fatigue, value U is calculated as 50 cm and a pair of special-purpose glasses for medium vision are fitted to meet the requirements. The above fitting method is determined based on actual common sight distance and personal need so as to simplify standard and facilitate application.

② Glasses use method: During normal life and doing homework, reading books, working, attending classes or playing games in a near distance, glasses may be worn. In general, a pair of glasses is enough, glasses for near vision, or for intermediate vision or for far vision. The glasses for far vision may replace glasses for near vision and glasses for intermediate vision, but glasses for near vision cannot replace glasses for far vision. Alternatively, 2 or 3 pairs of glasses for near vision, glasses for intermediate vision and glasses for far vision may be fitted and used alternately. Their prevention and treatment effect and function are basically the same. In order to cope with the heavy load and excessive fatigue of eyes of some students, preparing 2 or 3 pairs of glasses for alternative wear for different distances will have a better effect.

③ Observation time of treatment or prevention (period of treatment): a half year, statistical result.

Below is the detailed description:

A. Select appropriate lens number based on diopter, age and use distance according to the following tables.

B. The glasses for far vision for prevention and treatment of myopia may be worn around the clock and may also be used to look near. Myopes who don't often look into an intermediate or near distance don't need glasses for intermediate or near vision. If people often look near, for example: look into a distance of 0.5 m or 0.33 m for a long time, they may wear special-purpose glasses for intermediate or near vision. The effect will be better.

C. In general, a hyperope doesn't need to wear glasses for intermediate or near vision (looking near will naturally lead to myopia). If it is difficult or liable to fatigue to look near, glasses for near vision may be worn.

D. Teenagers and children at +0.25~−0.25D need myopia prevention. Glasses should be fitted by using myopia formula and A may be a negative value or 0; children aged 10~8 with hyperopia of above +1.00D and children aged 8~6 with hyperopia of above +1.50 need hyperopia prevention and glasses should be fitted by using hyperopia formula.

People needing myopia prevention don't need to wear glasses for far vision (because normal eyes won't become myopic when they look far). If the hyperopia is around or below +1.00 for children aged 10~8, and around or below +1.50D for children aged 8~6, hyperopia prevention and treatment are not needed (following the growth of age, they will naturally become emmetropic).

(I). Effect Standard

A. Treatment of Myopia

Cure: uncorrected visual acuity reaches 1.0 or above;

Special effect: Computer optometry indicates diopter becomes better and uncorrected visual acuity is raised by more than 3 lines;

Effective: Computer optometry indicates diopter remains unchanged and uncorrected visual acuity is raised by more than 2 lines or Computer optometry indicates diopter is developed (within −50D) and uncorrected visual acuity is raised by more than 3 lines;

Ineffective: Computer optometry indicates diopter is developed (beyond −50D) and uncorrected visual acuity is raised by less than two lines.

B. Treatment of Hyperopia

Cure: Uncorrected visual acuity reaches 1.0 or above;

Special effect: Computer optometry indicates diopter is reduced by more than 50D and uncorrected visual acuity is raised by more than 3 lines;

Effective: Computer optometry indicates diopter is reduced (within 50D) and uncorrected visual acuity is raised by more than two lines;

Ineffective: Computer optometry indicates diopter is not reduced and uncorrected visual acuity is raised by less than two lines.

C. Prevention of Myopia
Special effect: Computer optometry indicates diopter becomes better and uncorrected visual acuity is improved and reaches above 1.0;
Effective: Computer optometry indicates diopter remains unchanged and uncorrected visual acuity reaches 1.0 or above;
Ineffective: Computer optometry indicates diopter becomes worse or uncorrected visual acuity is reduced.

(IV). Effect Statistics

1). Statistics on Therapeutic Effect of Myopia a. Table of age distribution of myopic students:

| Sex | 6~8 | 8~10 | 10~12 Qty | 12~14 | 14~16 |
|---|---|---|---|---|---|
| | | | Age (year) | | |
| M | 20 | 90 | 103 | 101 | 72 |
| F | 26 | 111 | 98 | 94 | 83 | b. Severity distribution of myopia: within −300 is low myopia, 710 people; −300~−600 is moderate myopia, 64 people; above −600 is high myopia, 24 people.

c. Statistical table of therapeutic effect

| | | |
|---|---|---|
| Total quantity: 798 people | Total effective rate | 99% |
| Wherein, Cure: 694 people | Cure rate | 87% |
| Special effect: 68 people | Special effect rate | 8.5% |
| Effective: 30 people | Effective rate | 3.7% |
| Ineffective: 6 people | Ineffective rate | 0.75% |

2). Statistics on Therapeutic Effect of Hyperopia a. Table of are distribution of hyperopic students:

| Sex | 6~8 | 8~10 | 10~12 Qty | 12~14 | 14~16 |
|---|---|---|---|---|---|
| | | | Age (year) | | |
| M | 19 | 11 | 10 | 8 | 2 |
| F | 16 | 18 | 11 | 4 | 3 | b. Severity distribution of hyperopia: within 300 is low hyperopia, 78 people; 300~600 is moderate hyperopia, 23 people: above 600 is high hyperopia, 1 person.

c. Statistical table of therapeutic effect

| | | |
|---|---|---|
| Total quantity: 102 people | Total effective rate | 100% |
| Wherein, Cure: 89 people | Cure rate | 87.3% |
| Special effect: 8 people | Special effect rate | 7.8% |
| Effective: 5 people | Effective rate | 4.9% |
| Ineffective: 0 person | Ineffective rate | 0% |

3). Statistics on Preventive Effect of Myopia a. Table of age distribution of subjects needing myopia prevention:

| Sex | 6~8 | 8~10 | 10~12 Qty | 12~14 | 14~16 |
|---|---|---|---|---|---|
| | | | Age (year) | | |
| M | 12 | 25 | 28 | 20 | 15 |
| F | 11 | 22 | 27 | 26 | 14 | b. Situation distribution: the diopter of all the people needing myopia prevention falls into the range of +0.25~−0.25D.

c. Statistical table of effect

| | | |
|---|---|---|
| Total quantity: 200 people | Total effective rate | 100% |
| Wherein, Special effect: 176 people | Special effect rate | 88% |
| Effective: 24 people | Effective rate | 12% |
| Ineffective: 0 person | Ineffective rate | 0% |

II. Some embodiments of the present invention are shown in the following attached tables of embodiments (refer to Annex 1). Namely, Table A-Table of myopic glasses for far vision and effect thereof, Table B-Table of myopic glasses for intermediate vision and effect thereof, Table C-Table of myopic glasses for near vision and effect thereof, Table D-Table of hyperopic glasses for far vision and effect thereof, Table E-Table of hyperopic glasses for intermediate vision and effect thereof, Table F-Table of hyperopic glasses for near vision and effect thereof, Table G-Preventive glasses for intermediate vision and effect thereof, and Table H-Preventive glasses for near vision and effect thereof.

a. In the tables, glasses degree is calculated with defocus diopter formula and the diopter value in each part of the lens is determined and lens number is defined.

b. The examples in the table of embodiments are obtained by selecting representative students with different diopter values, and the effect of every single eye is listed. To sum up, 92 myopic eyes are treated, 18 hyperopic eyes are treated and 9 eyes are subjected to prevention.

III. Case Tables 1~3 are Attached (Refer to Annex 2).

a. In case tables 1~3, the combined value of diopter refers to myopic or hyperopic diopter plus a half of astigmatism value if astigmia exists. It is only for the convenience of record and statistics. Besides, N0 in case table 3—table of students needing prophylaxis means the vision of the child is normal and slightly hyperopic, and no glasses need to be worn for prevention and treatment.

b. In case tables 1~3, "A32", "C32" . . . refer to the lens numbers used in the tables of embodiments.

The glasses use methods in the table of embodiments and case tables 1~3 (here omitted) are the same as those described in the above clinical experiment. The observation time (period of treatment) is a half year, and then statistical results are obtained. In order to simplify standard and for easy selection, only one type of the glasses for near vision, glasses for intermediate vision and glasses for far vision listed in the tables is used.

The embodiments of lenses with other vision, defocus degree and diopter not listed in the table all have a good effect (omitted).

IV. Analysis and Description of Application Effect:

1. The significant improvement of vision indicates the design has achieved the expected goal and the improved diopter also indicates the effect in controlling ocular structure is good.

2. The analysis on the therapeutic effect of myopia discovers that the improvement amplitude of vision is greater than the improvement amplitude of diopter, suggesting the improvement of vision has two aspects: functional enhancement and structural improvement, while the significant reversal of ocular structure is relatively difficult. The therapeutic effect of hyperopia reveals the improvement amplitude of diopter is greater than the improvement amplitude of vision, suggesting the obvious improvement of ocular structure makes vision improved accordingly. In respect to the analysis on prevention effect, the result of optometry indicates the control of diopter variation is ideal.

3. The comparison of age and effect proves the effect at the age of development peak is even better, and proves the good role of the equatorial region in controlling ocular axis.

4. In view of the experimental result of hyperopia, the change of diopter and vision are significant, proving the change of ocular axis is large. Therefore, during wearing of glasses, close attention shall be paid to the change of vision and measured value. When normal condition is reached, the use of glasses may be stopped according to requirements. It is still very difficult to significantly reverse myopia. It may be related to the user's attitude towards the use of glasses and the bad daily habits. The due effect can be assured only when the users stick to proper use of glasses, correct bad habits and finally reduce the use of eyes. The use of glasses may be stopped only when the user's vision is stable until the user reaches a specific age.

5. Conventional methods may be adopted to record and fit glasses for astigmatic diopter. The lenticular lens for optometry may be directly added to each unit of the calculated lens for use.

6. The data in the tables of glasses are some fitting data selected for experiments and do not include all applicable data (as there are too many embodiments and data, it is not convenient to enumerate them one by one). In actual application, the optimum value and requirements may also be determined by specialists based on the principle or formula according to the present invention.

7. The above lens embodiments are mostly used in frame-type glasses. Experiments indicate the effect is good when they are used in the ocular of Galileo telescope, contact lens, clip-type hang glasses, therapeutic glasses (device), desktop type read-write glasses, ocular of reading telescope, table-mounted mirror or glasses with a controllable sight distance, or the ocular of Galileo telescope which is used to substitute the ocular of reading telescope (omitted).

Annex 1: Table of Embodiments

TABLE A

Table of myopic glasses for far vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| 5 | −0.5 | 5 | 5.2 | 4 | 3.7 | 0 | −0.3 | A 1 | −0.50 | 0 | 0.8 | 2.0 |
|  |  | 12 | 12.2 | 10 | 9.7 | 0.75 | 0.45 | A 2 | −0.50 | 0 | 0.6 | 2.0 |
|  |  |  |  |  |  | 0.5 | 0.2 | A 3 | −0.50 | 0 | 0.6 | 2.0 |
|  | −0.75 | 2 | 2.2 | 1 | 0.45 | 0.5 | −0.05 | A 4 | −0.75 | 0 | 0.5 | 1.2 |
|  |  | 6 | 6.2 | 4 | 3.45 | 0.75 | 0.2 | A 5 | −0.75 | 0 | 0.6 | 1.5 |
|  |  | 12 |  | 10 | 9.45 | 0.25 | −0.3 | A 6 | −0.75 | 0 | 0.5 | 1.0 |
|  |  | 21 | 21. | 20 | 19.45 | 0.5 | −0.05 | A 7 | −0.75 | 0 | 0.6 | 1.5 |
|  | −1.00 | 6 | 6.2 | 4 | 3.2 | 0.75 | −0.05 | A 8 | −1.00 | 0 | 0.4 | 1.0 |
|  |  | 12 | 12.2 | 10 | 9.2 | 0.25 | −0.55 | A 9 | −1.00 | 0 | 0.5 | 1.0 |
|  |  |  |  |  |  | 0.5 | −0.3 | A 10 | −1.00 | 0 | 0.4 | 1.2 |
|  | −1.25 | 5 | 5.2 | 4 | 2.95 | 0.75 | −0.3 | A 11 | −1.25 | 0 | 0.4 | 1.5 |
|  |  | 11 | 11.2 | 10 | 8.95 | 0.25 | −0.8 | A 12 | −1.25 | 0 | 0.3 | 1.0 |
|  |  |  |  |  |  | 0.5 | −0.55 | A 13 | −1.25 | 0 | 0.4 | 1.2 |
|  | −1.5 | 5 | 5.2 | 4 | 2.7 | 0.25 | −1.05 | A 14 | −1.50 | 0 | 0.4 | 1.2 |
|  |  |  |  |  |  | 0.5 | −0.8 | A 15 | −1.50 | 0 | 0.3 | 1.2 |
|  |  | 11 |  | 10 | 8.7 | 0.5 | −0.8 | A 16 | −1.50 | 0.5 | 0.3 | 0.6 |
|  | −1.75 | 11 |  | 10 | 8.45 | 0.25 | −1.30 | A 17 | −1.75 | −0.50 | 0.4 | 0.8 |
|  |  | 21 | 21.2 | 20 | 18.45 | 0.25 | −1.30 | A 18 | −1.75 | −0.75 | 0.3 | 0.6 |
|  |  |  |  |  |  | 0 | −1.55 | A 19 | −1.75 | −0.25 | 0.3 | 1.0 |
|  | −2.00 | 2 | 2.2 | 1 | −0.8 | 0.5 | −1.3 | A 20 | −2.00 | −0.75 | 0.25 | 0.8 |
|  |  | 5 | 5.2 | 4 | 2.2 | 0.75 | −1.05 | A 21 | −2.00 | −0.75 | 0.25 | 0.6 |
|  |  | 11 | 11.2 | 10 | 8.2 | 0.75 | −1.05 | A 22 | −2.00 | −0.50 | 0.3 | 0.8 |
|  | −2.25 | 2 | 2.2 | 1 | −1.05 | 0 | −2.05 | A 23 | −2.25 | −0.50 | 0.3 | 0.8 |
|  |  | 5 | 5.2 | 4 | 1.95 | 0.75 | −1.30 | A 24 | −2.25 | −0.75 | 0.25 | 0.6 |
|  |  | 11 | 11.2 | 10 | 7.95 | 0.25 | −1.8 | A 25 | −2.25 | −1.00 | 0.3 | 0.6 |
|  | −2.5 | 5 | 5.2 | 4 | 1.7 | 0.25 | −2.05 | A 26 | −2.50 | −1.00 | 0.15 | 0.3 |
|  |  |  |  |  |  | 0.5 | −1.8 | A 27 | −2.50 | −0.75 | 0.25 | 0.6 |
|  |  | 11 | 11.2 | 10 | 7.7 | 0 | −2.3 | A 28 | −2.50 | −1.00 | 0.25 | 0.5 |
|  | −2.75 | 2 | 2.2 | 1 | −1.55 | 0 | −2.55 | A 29 | −2.75 | −1.00 | 0.15 | 0.6 |
|  |  | 11 | 11.2 | 10 | 7.45 | 0.25 | −2.3 | A 30 | −2.75 | −1.75 | 0.12 | 0.25 |
|  |  | 21 | 21.2 | 20 | 17.45 | 0.25 | −2.3 | A 31 | −2.75 | −1.75 | 0.25 | 0.5 |
|  | −3.00 | 2 | 2.2 | 1 | −1.8 | 0.25 | −2.55 | A 32 | −3.00 | −1.50 | 0.15 | 0.3 |
|  |  |  |  |  |  | 0.5 | −2.3 | A 33 | −3.00 | −1.25 | 0.12 | 0.4 |
|  |  | 5 | 5.2 | 4 | 1.2 | 0.5 | −2.3 | A 34 | −3.00 | −1.50 | 0.15 | 0.4 |
|  |  | 11 | 11.2 | 10 | 7.2 | 0 | −2.8 | A 35 | −3.00 | −1.25 | 0.2 | 0.5 |
|  | −3.25 | 5 | 5.2 | 4 | 0.95 | 0.75 | −2.3 | A 36 | −3.25 | −2.00 | 0.12 | 0.25 |
|  |  | 11 | 11.2 | 10 | 6.95 | 0.75 | −1.55 | A 37 | −3.25 | −2.00 | 0.15 | 0.3 |
|  |  | 21 | 21.2 | 20 | 16.95 | 0.5 | −3.05 | A 38 | −3.25 | −1.75 | 0.15 | 0.4 |
|  | −3.5 | 5 | 5.2 | 4 | 0.7 | 0.25 | −3.05 | A 39 | −3.50 | −2.50 | 0.12 | 0.25 |
|  |  | 11 | 11.2 | 10 | 6.7 | 0.75 | −2.55 | A 40 | −3.50 | −2.00 | 0.12 | 0.3 |
|  |  | 21 | 21.2 | 20 | 16.7 | 0.75 | −2.55 | A 41 | −3.50 | −2.25 | 0.15 | 0.4 |

TABLE A-continued

Table of myopic glasses for far vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| | −3.75 | 5 | 5.2 | 4 | 0.45 | 0.25 | −3.3 | A 42 | −3.75 | −2.75 | 0.15 | 0.3 |
| | | 11 | 11.2 | 10 | 6.45 | 0.25 | −3.3 | A 43 | −3.75 | −2.75 | 0.12 | 0.25 |
| | | 21 | 21.2 | 20 | 16.45 | 0.75 | −2.8 | A 44 | −3.75 | −2.50 | 0.12 | 0.3 |
| | −4.00 | 5 | 5.2 | 4 | 0.2 | 0.75 | −3.05 | A 45 | −4.00 | −3.50 | 0.1 | 0.3 |
| | | 11 | 11.2 | 10 | 6.2 | 0.75 | −3.05 | A 46 | −4.00 | −3.25 | 0.12 | 0.25 |
| | | 21 | 21.2 | 20 | 16.2 | 0.75 | −3.05 | A 47 | −4.00 | −3.75 | 0.12 | 0.20 |
| | −4.25 | 2 | 2.2 | 1 | −3.05 | 0 | −4.05 | A 48 | −4.25 | −2.50 | 0.1 | 0.6 |
| | | 5 | 5.2 | 4 | −0.05 | 0.75 | −3.35 | A 49 | −4.25 | −3.00 | 0.1 | 0.4 |
| | | 11 | 11.2 | 10 | 5.95 | 0 | −4.05 | A 50 | −4.25 | −3.50 | 0.2 | 0.25 |
| | −4.5 | 5 | 5.2 | 4 | −0.30 | 0.75 | −3.55 | A 51 | −4.50 | −3.75 | 0.1 | 0.25 |
| | | 11 | 11.2 | 10 | 5.70 | 0.25 | −4.05 | A 52 | −4.50 | −2.75 | 0.08 | 0.2 |
| | | 21 | 21.2 | 20 | 15.70 | 0.25 | −4.05 | A 53 | −4.50 | −3.50 | 0.1 | 0.2 |
| | −4.75 | 2 | 2.2 | 1 | −3.55 | 0 | −4.55 | A 54 | −4.75 | −3.25 | 0.06 | 0.12 |
| | | 5 | 5.2 | 4 | −0.55 | 0 | −4.55 | A 55 | −4.75 | −3.00 | 0.08 | 0.15 |
| | | 21 | 21.2 | 20 | 15.45 | 0.25 | −4.30 | A 56 | −4.75 | −3.75 | 0.08 | 0.15 |
| | −5.00 | 5 | 5.2 | 4 | −0.80 | 0.25 | −4.55 | A 57 | −5.00 | −4.00 | 0.06 | 0.12 |
| | | 11 | 11.2 | 10 | 5.20 | 0.25 | −4.55 | A 58 | −5.00 | −4.00 | 0.06 | 0.12 |
| | | 21 | 21.2 | 20 | 15.20 | 0.75 | −4.05 | A 59 | −5.00 | −3.25 | 0.08 | 0.15 |
| | −5.25 | 5 | 5.2 | 4 | −1.05 | 0.25 | −4.80 | A 60 | −5.25 | −4.50 | 0.06 | 0.1 |
| | | | | | | 0 | −5.05 | A 61 | −5.25 | −4.25 | 0.08 | 0.15 |
| | | 21 | 21.2 | 20 | 14.95 | 0.25 | −4.80 | A 62 | −5.25 | −4.25 | 0.06 | 0.12 |
| | −5.5 | 2 | 2.2 | 1 | −4.30 | 0.25 | −5.05 | A63 | −5.50 | −4.00 | 0.06 | 0.1 |
| | | 5 | 5.2 | 4 | −1.30 | 0 | −5.3 | A 64 | −5.50 | −3.50 | 0.08 | 0.15 |
| | | 21 | 21.2 | 20 | 14.70 | 0.75 | −4.55 | A 65 | −5.50 | −3.75 | 0.08 | 0.15 |
| | −5.75 | 5 | 5.2 | 4 | −1.55 | 0.25 | −5.30 | A 66 | −5.75 | −4.25 | 0.06 | 0.1 |
| | | 11 | 11.2 | 10 | 4.45 | 0.25 | −5.30 | A 67 | −5.75 | −4.75 | 0.08 | 0.12 |
| | | 21 | 21.2 | 20 | 14.45 | 0.75 | −4.80 | A 68 | −5.75 | −4.25 | 0.06 | 0.15 |
| | −6.00 | 5 | 5.2 | 4 | −1.80 | 0.75 | −5.75 | A 69 | −6.00 | −4.50 | 0.08 | 0.2 |
| | | 11 | 11.2 | 10 | 4.20 | 0.75 | −5.75 | A 70 | −6.00 | −4.25 | 0.08 | 0.2 |
| | | 21 | 21.2 | 20 | 14.20 | 0.75 | −5.75 | A 71 | −6.00 | −4.75 | 0.06 | 0.1 |
| | −6.25 | 5 | 5.2 | 4 | −2.05 | 0.75 | −5.30 | A 72 | −6.25 | −4.50 | 0.06 | 0.15 |
| | −6.50 | 2 | 2.2 | 1 | −5.30 | 0.75 | −5.55 | A 73 | −6.50 | −5.00 | 0.06 | 0.12 |
| | | 11 | 11.2 | 10 | 3.70 | 0 | −6.30 | A 74 | −6.50 | −4.75 | 0.08 | 0.2 |
| | −6.75 | 5 | 5.2 | 4 | −2.55 | 0.75 | −5.80 | A 75 | −6.75 | −5.25 | 0.06 | 0.15 |
| | −7.00 | 5 | 5.2 | 4 | −2.80 | 0 | −6.8 | A 76 | −7.00 | −5.25 | 0.04 | 0.08 |
| | | 11 | 11.2 | 10 | 3.20 | 0 | −6.8 | A 77 | −7.00 | −5.00 | 0.06 | 0.1 |
| | −7.25 | 11 | 11.2 | 10 | 2.95 | 0.25 | −6.80 | A 78 | −7.25 | −5.50 | 0.06 | 0.1 |
| | | 21 | 21.2 | 20 | 12.95 | 0.75 | −6.30 | A 79 | −7.25 | −5.25 | 0.06 | 0.12 |
| | −7.50 | 2 | 2.2 | 1 | −6.30 | 0 | −7.3 | A 80 | −7.00 | −5.00 | 0.04 | 0.1 |
| | | 11 | 11.2 | 10 | 2.70 | 0.25 | −7.05 | A 81 | −7.50 | −5.75 | 0.06 | 0.12 |
| | −7.75 | 5 | 5.2 | 4 | −3.55 | 0.75 | −6.80 | A 82 | −7.75 | −6.25 | 0.06 | 0.1 |
| | −8.00 | 5 | 5.2 | 4 | −3.80 | 0.75 | −7.05 | A 83 | −8.00 | −6.50 | 0.04 | 0.08 |
| | −8.25 | 2 | 2.2 | 1 | −7.05 | 0.25 | −7.80 | A 84 | −8.25 | −6.00 | 0.04 | 0.08 |
| | −8.75 | 2 | 2.2 | 1.75 | −6.80 | 0 | −8.55 | A 85 | −8.75 | −6.75 | 0.04 | 0.08 |
| | −9.00 | 11 | 11.2 | 10 | 1.20 | 0.75 | −8.05 | A 86 | −9.00 | −6.25 | 0.02 | 0.06 |
| 10 | −4.00 | 5 | 5.1 | 2 | −1.9 | 0.25 | −3.65 | A87 | −4.00 | −3.25 | 0.08 | 0.4 |
| | | 10 | 10.1 | 8 | 4.1 | 0 | −3.9 | A88 | −4.00 | −3.00 | 0.06 | 0.4 |
| | | | | | | 0.75 | −2.15 | A89 | −4.00 | −3.00 | 0.04 | 0.5 |
| 3 | −3.00 | 4 | 4.33 | 3.5 | 0.83 | 0.25 | −2.42 | A90 | −3.00 | −1.75 | 0.15 | 0.5 |
| | | 12 | 12.33 | 7 | 4.33 | 0 | −2.67 | A91 | −3.00 | −2.00 | 0.15 | 0.5 |
| | | | | | | 0.75 | 1.92 | A92 | −3.00 | −1.75 | 0.25 | 0.8 |

TABLE B

Table of myopic glasses for intermediate vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| 0.5 | −0.5 | 5 | 7 | 4 | 5.5 | 0 | 1.5 | B 1 | −0.50 | 0 | 0.8 | 2.0 |
| | | 11 | 13 | 10 | 11.5 | 0.75 | 2.25 | B 2 | −0.50 | 0 | 0.6 | 2.0 |
| | | | | | | 0.5 | 2.00 | B 3 | −0.50 | 0 | 0.6 | 2.0 |
| | −0.75 | 2 | 4 | 1 | 2.25 | 0 | 1.25 | B 4 | −0.75 | 0 | 0.5 | 1.2 |
| | | 5 | 7 | 4 | 5.25 | 0.75 | 2.00 | B 5 | −0.75 | 0 | 0.6 | 1.5 |

TABLE B-continued

Table of myopic glasses for intermediate vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| | | 11 | 13 | 10 | 11.25 | 0.25 | 1.5 | B 6 | 0.75 | 0 | 0.5 | 1.0 |
| | | 21 | 23 | 20 | 21.15 | 0.5 | 1.75 | B 7 | −0.75 | 0 | 0.6 | 1.5 |
| | −1.00 | 5 | 7 | 4 | 5.00 | 0.75 | 1.75 | B 8 | −1.00 | 0 | 0.4 | 1.0 |
| | | 11 | 13 | 10 | 11.00 | 0.25 | 1.25 | B 9 | −1.00 | 0 | 0.5 | 1.0 |
| | | | | | | 0 | 1.00 | B 10 | −1.00 | 0 | 0.4 | 1.2 |
| | −1.25 | 5 | 7 | 4 | 4.75 | 0.75 | 1.5 | B 11 | −1.25 | 0 | 0.4 | 1.5 |
| | | 11 | 13 | 10 | 10.75 | 0.25 | 1.00 | B 12 | −1.25 | 0 | 0.3 | 1.0 |
| | | | | | | 0.5 | 2.25 | B 13 | −1.25 | 0 | 0.4 | 1.2 |
| | −1.50 | 5 | 7 | 4 | 4.5 | 0.25 | 0.75 | B 14 | −1.50 | 0 | 0.4 | 1.2 |
| | | | | | | 0 | 0.5 | B 15 | −1.50 | 0 | 0.3 | 1.2 |
| | | 11 | 13 | 10 | 10.5 | 0.5 | 1 | B 16 | −1.50 | 0.5 | 0.3 | 0.6 |
| | −1.75 | 11 | 13 | 10 | 10.25 | 0.25 | 0.50 | B 17 | −1.75 | −0.50 | 0.4 | 0.8 |
| | | 21 | 23 | 20 | 20.25 | 0.25 | 0.50 | B 18 | −1.75 | −0.75 | 0.3 | 0.6 |
| | | | | | | 0 | 0.25 | B 19 | −1.75 | −0.25 | 0.3 | 1.0 |
| | −2.00 | 2 | 4 | 1 | 1.00 | 0 | 0 | B 20 | −2.00 | −0.75 | 0.25 | 0.8 |
| | | 5 | 7 | 4 | 4.00 | 0.75 | 0.75 | B 21 | −2.00 | −0.75 | 0.25 | 0.6 |
| | | 11 | 13 | 10 | 10.0 | 0.75 | 0.75 | B 22 | −2.00 | −0.50 | 0.3 | 0.8 |
| | −2.25 | 2 | 4 | 1.75 | 1.5 | 0 | −0.25 | B 23 | −2.25 | −0.50 | 0.3 | 0.8 |
| | | 5 | 7 | 4 | 3.75 | 0.75 | 0.5 | B 24 | −2.25 | −0.75 | 0.25 | 0.6 |
| | | 11 | 13 | 10 | 9.75 | 0.25 | 0.00 | B 25 | −2.25 | −1.00 | 0.3 | 0.6 |
| | −2.5 | 5 | 7 | 4 | 3.50 | 0.25 | −0.25 | B 26 | −2.50 | −1.00 | 0.15 | 0.3 |
| | | | | | | 0 | −0.5 | B 27 | −2.50 | −0.75 | 0.25 | 0.6 |
| | | 11 | 13 | 10 | 9.50 | 0.5 | 0.00 | B 28 | −2.50 | −1.00 | 0.25 | 0.5 |
| | −2.75 | 2 | 4 | 1 | 0.25 | 0 | −0.75 | B 29 | −2.75 | −1.00 | 0.25 | 0.6 |
| | | 11 | 13 | 10 | 9.25 | 0.25 | −0.50 | B 30 | −2.75 | −1.75 | 0.12 | 0.25 |
| | | 21 | 23 | 20 | 19.25 | 0.25 | −0.50 | B 31 | −2.75 | −1.75 | 0.25 | 0.5 |
| | −3.00 | 2 | 4 | 1 | 0 | 0.25 | −0.75 | B32 | −3.00 | −1.50 | 0.15 | 0.3 |
| | | | | | | 0.5 | −0.5 | B 33 | −3.00 | −1.25 | 0.12 | 0.4 |
| | | 5 | 7 | 4 | 3.00 | 0.5 | −0.5 | B 34 | −3.00 | −1.50 | 0.15 | 0.4 |
| | | 11 | 13 | 10 | 9.00 | 0 | −1.00 | B 35 | −3.00 | −1.25 | 0.2 | 0.5 |
| | −3.25 | 5 | 7 | 4 | 2.75 | 0.75 | −0.50 | B 36 | −3.25 | −2.00 | 0.12 | 0.25 |
| | | 11 | 13 | 10 | 8.75 | 0.75 | −0.50 | B 37 | −3.25 | −2.00 | 0.15 | 0.3 |
| | | 21 | 23 | 20 | 18.75 | 0 | −1.25 | B 38 | −3.25 | −1.75 | 0.15 | 0.4 |
| | −3.5 | 5 | 7 | 4 | 2.5 | 0.25 | −1.25 | B 39 | −3.50 | −2.50 | 0.12 | 0.25 |
| | | 11 | 13 | 10 | 8.5 | 0.75 | −0.75 | B 40 | −3.50 | −2.00 | 0.12 | 0.3 |
| | | 21 | 23 | 20 | 18.5 | 0.5 | −1.00 | B 41 | −3.50 | −2.25 | 0.15 | 0.4 |
| | −3.75 | 5 | 7 | 4 | 2.25 | 0.25 | −1.50 | B 42 | −3.75 | −2.75 | 0.15 | 0.3 |
| | | 11 | 13 | 10 | 8.25 | 0.5 | −1.25 | B 43 | −3.75 | −2.75 | 0.12 | 0.25 |
| | | 21 | 23 | 20 | 18.25 | 0.75 | −1.00 | B 44 | −3.75 | −2.50 | 0.12 | 0.3 |
| | −4.00 | 5 | 7 | 4 | 2.00 | 0.75 | −1.25 | B 45 | −4.00 | −3.50 | 0.1 | 0.3 |
| | | 11 | 13 | 10 | 8.00 | 0.5 | −1.50 | B 46 | −4.00 | −3.25 | 0.12 | 0.25 |
| | | 21 | 23 | 20 | 18.00 | 0.75 | −1.25 | B 47 | −4.00 | −3.75 | 0.12 | 0.20 |
| | −4.25 | 2 | 4 | 1 | −1.25 | 0 | −2.25 | B 48 | −4.25 | −2.50 | 0.1 | 0.6 |
| | | 5 | 7 | 4 | 1.75 | 0.75 | −1.5 | B 49 | −4.25 | −3.00 | 0.1 | 0.4 |
| | | 11 | 13 | 10 | 7.75 | 0 | −2.25 | B 50 | −4.25 | −3.50 | 0.2 | 0.25 |
| | −4.5 | 5 | 7 | 4 | 1.5 | 0.75 | −1.75 | B 51 | −4.50 | −3.75 | 0.1 | 0.25 |
| | | 11 | 13 | 10 | 7.5 | 0.25 | −2.25 | B 52 | −4.50 | −2.75 | 0.08 | 0.2 |
| | | 21 | 23 | 20 | 17.5 | 0.25 | −2.25 | B 53 | −4.50 | −3.50 | 0.1 | 0.2 |
| | −4.75 | 2 | 4 | 1 | −1.75 | 0 | −2.75 | B 54 | −4.75 | −2.25 | 0.06 | 0.12 |
| | | 5 | 7 | 4 | 1.25 | 0 | −2.75 | B 55 | −4.75 | −3.00 | 0.08 | 0.15 |
| | | 21 | 23 | 20 | 17.25 | 0.15 | −2.50 | B 56 | −4.75 | −3.75 | 0.08 | 0.15 |
| | −5.00 | 5 | 7 | 4 | 1.00 | 0.25 | −2.75 | B 57 | −5.00 | −4.00 | 0.06 | 0.12 |
| | | 11 | 13 | 10 | 7.00 | 0.5 | −2.5 | B 58 | −5.00 | −4.00 | 0.06 | 0.12 |
| | | 21 | 23 | 20 | 17.00 | 0.75 | −2.25 | B 59 | −5.00 | −3.25 | 0.08 | 0.15 |
| | −5.25 | 5 | 7 | 4 | 0.75 | 0.25 | −3.00 | B 60 | −5.25 | −4.50 | 0.06 | 0.1 |
| | | | | | | 0 | −3.25 | B 61 | −5.25 | −4.25 | 0.08 | 0.15 |
| | | 21 | 23 | 20 | 16.75 | 0.5 | −2.75 | B 62 | −5.25 | −4.25 | 0.06 | 0.12 |
| | −5.5 | 2 | 4 | 1 | −2.50 | 0.25 | −3.25 | B63 | −5.50 | −4.00 | 0.06 | 0.1 |
| | | 5 | 7 | 4 | 0.5 | 0 | −3.5 | B64 | −5.50 | −3.50 | 0.08 | 0.15 |
| | | 21 | 23 | 20 | 16.5 | 0.75 | −2.75 | B65 | −5.50 | −3.75 | 0.08 | 0.15 |
| | −5.75 | 5 | 7 | 4 | 0.25 | 0.25 | −3.50 | B66 | −5.75 | −4.25 | 0.06 | 0.1 |
| | | 11 | 13 | 10 | 6.25 | 0.5 | −3.25 | B67 | −5.75 | −4.75 | 0.08 | 0.12 |
| | | 21 | 23 | 20 | 16.25 | 0.75 | −3.00 | B68 | −5.75 | −4.25 | 0.06 | 0.15 |
| | −6.00 | 5 | 7 | 4 | 0.00 | 0 | −4.00 | B69 | −6.00 | −4.50 | 0.08 | 0.2 |
| | | 11 | 13 | 10 | 6.00 | 0.5 | −3.5 | B 70 | −6.00 | −4.25 | 0.08 | 0.2 |
| | | 21 | 23 | 20 | 16.00 | 0.75 | −3.25 | B71 | −6.00 | −4.75 | 0.06 | 0.1 |
| | −6.25 | 5 | 7 | 4 | −0.25 | 0.75 | −3.50 | B72 | −6.25 | −4.50 | 0.06 | 0.15 |
| | −6.50 | 2 | 4 | 1 | −3.50 | 0.5 | −4.00 | B73 | −6.50 | −5.00 | 0.06 | 0.12 |
| | | 11 | 13 | 10 | 5.50 | 0 | −4.50 | B74 | −6.50 | −4.75 | 0.08 | 0.2 |
| | −6.75 | 5 | 7 | 4 | −0.75 | 0.75 | −4.00 | B75 | −6.75 | −5.25 | 0.06 | 0.15 |

TABLE B-continued

Table of myopic glasses for intermediate vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| | −7.00 | 5 | 7 | 4 | −1.00 | 0.5 | −4.5 | B76 | −7.00 | −5.25 | 0.04 | 0.08 |
| | | 11 | 13 | 10 | 5.00 | 0 | −5.00 | B77 | −7.00 | −5.00 | 0.06 | 0.1 |
| | −7.25 | 11 | 13 | 10 | −4.75 | 0.25 | −5.00 | B78 | −7.25 | −5.50 | 0.06 | 0.1 |
| | | 21 | 23 | 20 | 14.75 | 0.75 | −4.50 | B79 | −7.25 | −5.25 | 0.06 | 0.12 |
| | −7.5 | 2 | 4 | 1 | −4.50 | 0.5 | −5.00 | B80 | −7.50 | −5.00 | 0.04 | 0.1 |
| | | 11 | 13 | 10 | 4.50 | 0.25 | −5.25 | B81 | −7.50 | −5.75 | 0.06 | 0.12 |
| | −7.75 | 5 | 7 | 4 | −1.75 | 0.75 | −5.00 | B82 | −7.75 | −6.25 | 0.06 | 0.1 |
| | −8.00 | 5 | 7 | 4 | −2.00 | 0.75 | −5.25 | B83 | −8.00 | −6.50 | 0.04 | 0.08 |
| | −8.25 | 2 | 4 | 1 | −5.25 | 0.25 | −6.00 | B84 | −8.25 | −6.00 | 0.04 | 0.08 |
| | −8.75 | 2 | 4 | 1.75 | −5.00 | 0 | −6.75 | B85 | −8.75 | −6.75 | 0.04 | 0.08 |
| | −9.00 | 11 | 13 | 10 | 3.00 | 0.75 | −8.25 | B86 | −9.00 | −6.25 | 0.02 | 0.06 |
| 1 | −2.00 | 4 | 4 | 1 | 0 | 0.25 | −0.75 | B87 | −2.00 | −1.25 | 0.4 | 0.8 |
| | | 10 | 10 | 8 | 7 | 0 | −1 | B88 | −2.00 | −1.00 | 0.5 | 0.6 |
| | | | | | | 0.75 | −0.25 | B89 | −2.00 | −0.75 | 0.4 | 0.8 |
| 0.4 | −3.5 | 5 | 7.5 | 3 | 2 | 0.25 | −0.75 | B90 | −3.5 | −2.75 | 0.12 | 0.25 |
| | | 10 | 12.5 | 7 | 6 | 0 | −1 | B91 | −3.5 | −2.50 | 0.15 | 0.3 |
| | | | | | | 0.75 | −0.25 | B92 | −3.5 | −2.00 | 0.12 | 0.5 |

TABLE C

Table of myopic glasses for near vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| 0.33 | −0.5 | 5 | 8 | 4 | 6.53 | 0 | 2.5 | C 1 | −0.50 | 0 | 0.8 | 2.0 |
| | | 11 | 14 | 10 | 12.53 | 0.75 | 3.28 | C 2 | −0.50 | 0 | 0.6 | 2.0 |
| | | | | | | 0.5 | 3.03 | C 3 | −0.50 | 0 | 0.6 | 2.0 |
| | −0.75 | 2 | 5 | 1 | 3.28 | 0.5 | 2.78 | C 4 | 0.75 | 0 | 0.5 | 1.2 |
| | | 5 | 8 | 4 | 6.28 | 0.75 | 3.03 | C 5 | 0.75 | 0 | 0.6 | 1.5 |
| | | 11 | 14 | 10 | 12.28 | 0.25 | 2.53 | C 6 | 0.75 | 0 | 0.5 | 1.0 |
| | | 21 | 24 | 20 | 22.28 | 0.5 | 2.78 | C 7 | 0.75 | 0 | 0.6 | 1.5 |
| | −1.00 | 5 | 8 | 4 | 6.03 | 0.75 | 2.78 | C 8 | −1.00 | 0 | 0.4 | 1.0 |
| | | 11 | 14 | 10 | 12.03 | 0.25 | 2.28 | C 9 | −1.00 | 0 | 0.5 | 1.0 |
| | | | | | | 0.5 | 2.53 | C10 | −1.00 | 0 | 0.4 | 1.2 |
| | −1.25 | 5 | 8 | 4 | 5.78 | 0.75 | 2.53 | C11 | −1.25 | 0 | 0.4 | 1.5 |
| | | 11 | 14 | 10 | 11.78 | 0.25 | 2.03 | C12 | −1.25 | 0 | 0.3 | 1.0 |
| | | | | | | 0.5 | 2.28 | C13 | −1.25 | 0 | 0.4 | 1.2 |
| | −1.5 | 5 | 8 | 4 | 5.53 | 0.25 | 1.78 | C14 | −1.50 | 0 | 0.4 | 1.2 |
| | | | | | | 0.5 | 2.03 | C15 | −1.50 | 0 | 0.3 | 1.2 |
| | | 11 | 14 | 10 | 11.53 | 0 | 1.53 | C16 | −1.50 | −0.50 | 0.3 | 0.6 |
| | −1.75 | 11 | 14 | 10 | 11.28 | 0.25 | 1.53 | C17 | −1.75 | −0.50 | 0.4 | 0.8 |
| | | 21 | 24 | 20 | 21.28 | 0.25 | 1.53 | C18 | −1.75 | −0.75 | 0.3 | 0.6 |
| | | | | | | 0 | 1.28 | C19 | −1.75 | −0.25 | 0.3 | 1.0 |
| | −2.00 | 2 | 5 | 1 | 2.03 | 0 | 1.03 | C20 | −2.00 | −0.75 | 0.25 | 0.8 |
| | | 5 | 8 | 4 | 5.03 | 0.75 | 1.78 | C21 | −2.00 | −0.75 | 0.25 | 0.6 |
| | | 11 | 14 | 10 | 11.03 | 0.75 | 1.78 | C22 | −2.00 | −0.50 | 0.3 | 0.8 |
| | −2.25 | 2 | 5 | 1 | 1.78 | 0 | 0.78 | C23 | −2.25 | −0.50 | 0.3 | 0.8 |
| | | 3 | 8 | 4 | 4.78 | 0.75 | 1.53 | C24 | −2.25 | −0.75 | 0.25 | 0.6 |
| | | 11 | 14 | 10 | 10.78 | 0.25 | 1.03 | C25 | −2.25 | −1.00 | 0.3 | 0.6 |
| | −2.5 | 5 | 8 | 4 | 4.53 | 0.25 | 0.78 | C26 | −2.50 | −1.00 | 0.15 | 0.3 |
| | | | | | | 0 | 0.53 | C27 | −2.50 | −0.75 | 0.25 | 0.6 |
| | | 11 | 14 | 10 | 10.53 | 0 | 0.53 | C28 | −2.50 | −1.00 | 0.25 | 0.5 |
| | −2.75 | 2 | 5 | 1.75 | 2.03 | 0 | 0.28 | C29 | −2.75 | 1.00 | 0.25 | 0.6 |
| | | 11 | 14 | 10 | 10.28 | 0.25 | 0.53 | C30 | −2.75 | −1.75 | 0.12 | 0.25 |
| | | 21 | 24 | 20 | 20.28 | 0.25 | 0.53 | C31 | −2.75 | −1.75 | 0.25 | 0.5 |
| | −3.00 | 2 | 5 | 1 | 1.03 | 0.25 | 0.28 | C32 | −3.00 | −1.50 | 0.15 | 0.3 |
| | | | | | | 0.5 | 0.53 | C33 | −3.00 | −1.25 | 0.12 | 0.4 |
| | | 5 | 8 | 4 | 4.03 | 0.5 | 0.53 | C34 | −3.00 | −1.50 | 0.15 | 0.4 |
| | | 11 | 14 | 10 | 10.03 | 0.5 | 0.53 | C35 | −3.00 | −1.25 | 0.2 | 0.5 |
| | −3.25 | 5 | 8 | 4 | 3.78 | 0.75 | 0.53 | C36 | −3.25 | −2.00 | 0.12 | 0.25 |
| | | 11 | 14 | 10 | 9.78 | 0.75 | 0.53 | C37 | −3.25 | −2.00 | 0.15 | 0.3 |
| | | 21 | 24 | 20 | 19.78 | 0.5 | 0.28 | C38 | −3.25 | −1.75 | 0.15 | 0.4 |

TABLE C-continued

Table of myopic glasses for near vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| | -3.50 | 5 | 8 | 4 | 3.53 | 0.25 | -0.22 | C39 | -3.50 | -2.50 | 0.12 | 0.25 |
| | | 11 | 14 | 10 | 9.53 | 0.75 | 0.28 | C40 | -3.50 | -2.00 | 0.12 | 0.3 |
| | | 21 | 24 | 20 | 19.53 | 0.75 | 0.28 | C41 | -3.50 | -2.25 | 0.15 | 0.4 |
| | -3.75 | 5 | 8 | 4 | 3.28 | 0.25 | -0.47 | C42 | -3.75 | -2.75 | 0.15 | 0.3 |
| | | 11 | 14 | 10 | 9.28 | 0.25 | -0.47 | C43 | -3.75 | -2.75 | 0.12 | 0.25 |
| | | 21 | 24 | 20 | 19.28 | 0.75 | 0.03 | C44 | -3.75 | -2.50 | 0.12 | 0.3 |
| | -4.00 | 5 | 8 | 4 | 3.03 | 0.75 | -0.22 | C45 | -4.00 | -3.50 | 0.1 | 0.3 |
| | | 11 | 14 | 10 | 9.03 | 0.75 | -0.22 | C46 | -4.00 | -3.25 | 0.12 | 0.25 |
| | | 21 | 24 | 20 | 19.03 | 0.75 | -0.22 | C47 | -4.00 | -3.75 | 0.12 | 0.20 |
| | -4.25 | 2 | 5 | 1 | -0.22 | 0 | -1.22 | C48 | -4.25 | -2.50 | 0.1 | 0.6 |
| | | 5 | 8 | 4 | 2.78 | 0.75 | -0.47 | 49 | -4.25 | -3.00 | 0.1 | 0.4 |
| | | 11 | 14 | 10 | 8.78 | 0 | -1.22 | C50 | -4.25 | -3.50 | 0.2 | 0.25 |
| | -4.50 | 5 | 8 | 4 | 2.53 | 0.75 | -0.72 | C51 | -4.50 | -3.75 | 0.1 | 0.25 |
| | | 11 | 14 | 10 | 8.53 | 0.25 | -1.22 | C52 | -4.50 | -2.75 | 0.08 | 0.2 |
| | | 21 | 24 | 20 | 18.53 | 0.25 | -1.22 | C53 | -4.50 | -3.50 | 0.1 | 0.2 |
| | -4.75 | 2 | 5 | 1 | -0.72 | 0 | -1.72 | C54 | -4.75 | -3.25 | 0.06 | 0.12 |
| | | 5 | 8 | 4 | 2.28 | 0 | -1.72 | C55 | -4.75 | -3.00 | 0.08 | 0.15 |
| | | 21 | 24 | 20 | 18.28 | 0.25 | -1.47 | C56 | -4.75 | -3.75 | 0.08 | 0.15 |
| | -5.00 | 5 | 8 | 4 | 2.03 | 0.25 | -1.72 | C57 | -5.00 | -4.00 | 0.06 | 0.12 |
| | | 11 | 14 | 10 | 8.03 | 0.25 | -1.72 | C58 | -5.00 | -4.00 | 0.08 | 0.12 |
| | | 21 | 24 | 20 | 18.03 | 0.75 | -1.22 | C59 | -5.00 | -3.25 | 0.08 | 0.15 |
| | -5.25 | 5 | 8 | 4 | 1.78 | 0.25 | -1.97 | C60 | -5.25 | -4.50 | 0.06 | 0.1 |
| | | | | | | 0 | -2.22 | C61 | -5.25 | -4.25 | 0.08 | 0.15 |
| | | 21 | 24 | 20 | 17.78 | 0.25 | -1.97 | C62 | -5.25 | -4.25 | 0.06 | 0.12 |
| | -5.5 | 2 | 5 | 1 | -1.47 | 0.25 | -2.22 | C63 | -5.50 | -4.00 | 0.06 | 0.1 |
| | | 5 | 8 | 4 | 1.53 | 0 | -2.47 | C64 | -5.50 | -3.50 | 0.08 | 0.15 |
| | | 21 | 24 | 20 | 17.53 | 0.75 | -1.72 | C65 | -5.50 | -3.75 | 0.08 | 0.15 |
| | -5.75 | 5 | 8 | 4 | 1.28 | 0.25 | -2.47 | C66 | -5.75 | -4.25 | 0.06 | 0.1 |
| | | 11 | 14 | 10 | 7.28 | 0.25 | -2.47 | C67 | -5.75 | -4.75 | 0.08 | 0.12 |
| | | 21 | 24 | 20 | 17.28 | 0.75 | -1.97 | C68 | -5.75 | -4.25 | 0.06 | 0.15 |
| | -6.00 | 5 | 8 | 4 | 1.03 | 0.75 | -2.22 | C69 | -6.00 | -4.50 | 0.08 | 0.2 |
| | | 11 | 14 | 10 | 7.03 | 0.75 | -2.22 | C70 | -6.00 | -4.25 | 0.08 | 0.2 |
| | | 21 | 24 | 20 | 17.03 | 0.75 | -2.22 | C71 | -6.00 | -4.75 | 0.66 | 0.1 |
| | -6.25 | 5 | 8 | 4 | 0.78 | 0.75 | -2.47 | C72 | -6.25 | -4.50 | 0.06 | 0.15 |
| | -6.50 | 2 | 5 | 1 | -2.47 | 0.75 | -2.72 | C73 | -6.50 | -5.00 | 0.06 | 0.12 |
| | | 11 | 14 | 10 | 6.53 | 0 | -3.47 | C74 | -6.50 | -4.75 | 0.08 | 0.2 |
| | -6.75 | 5 | 8 | 4 | 0.28 | 0.75 | -2.97 | C75 | -6.75 | -5.25 | 0.06 | 0.15 |
| | -7.00 | 5 | 8 | 4 | 0.03 | 0 | -3.97 | C76 | -7.00 | -5.25 | 0.04 | 0.08 |
| | | 11 | 14 | 10 | 6.03 | 0 | -3.97 | C77 | -7.00 | -5.00 | 0.06 | 0.1 |
| | -7.25 | 11 | 14 | 10 | 5.78 | 0.25 | -3.97 | C78 | -7.25 | -5.5 | 0.06 | 0.1 |
| | | 21 | 24 | 20 | 15.78 | 0.75 | -.47 | C79 | -7.25 | -5.25 | 0.06 | 0.12 |
| | -7.5 | 2 | 5 | 1 | -3.47 | 0 | -4.47 | C80 | -7.50 | -5.00 | 0.04 | 0.1 |
| | | 11 | 14 | 10 | 5.53 | 0.25 | -4.22 | C81 | -7.50 | -5.75 | 0.06 | 0.12 |
| | -7.75 | 5 | 8 | 4 | -0.72 | 0.75 | -3.77 | C82 | -7.75 | -6.25 | 0.06 | 0.1 |
| | -8.00 | 5 | 8 | 4 | -0.97 | 0.75 | -4.22 | C83 | -8.00 | -6.50 | 0.04 | 0.08 |
| | -8.25 | 2 | 5 | 1.75 | -3.47 | 0.25 | -4.97 | C84 | -8.25 | -6.00 | 0.04 | 0.08 |
| | -8.75 | 2 | 5 | 1 | -4.72 | 0 | -5.72 | C85 | -8.75 | -6.75 | 0.04 | 0.08 |
| | -9.00 | 11 | 14 | 10 | 4.03 | 0.75 | -5.22 | C86 | -9.00 | -6.25 | 0.02 | 0.06 |
| 0.25 | -4.50 | 6 | 10 | 5 | 4.5 | 0.25 | -0.25 | C87 | -4.50 | -3.75 | 0.05 | 0.15 |
| | | 12 | 16 | 10 | 9.5 | 0 | -0.5 | C88 | -4.50 | -3.75 | 0.06 | 0.2 |
| | | | | | | 0.75 | 0.25 | C89 | -4.50 | -3.50 | 0.06 | 0.25 |
| 0.2 | -5.50 | 5 | 5.5 | 3 | 2.5 | 0.25 | -0.25 | C90 | -5.50 | -4.50 | 0.05 | 0.12 |
| | | 12 | 12.5 | 10 | 9.5 | 0 | -0.5 | C91 | -5.50 | -3.75 | 0.06 | 0.15 |
| | | | | | | 0.75 | 0.25 | C92 | -5.50 | -4.50 | 0.05 | 0.25 |

TABLE D

Table of hyperopic glasses for far vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| 5 | 1.50 | 0.5 | 0.7 | −4.00 | −2.3 | −0.25 | 1.45 | D1 | 1.50 | 0.00 | 1.0 | 2.0 |
|  |  |  |  |  |  | −0.50 | 1.20 | D2 | 1.50 | 0.00 | 1.2 | 1.5 |
|  |  |  |  |  |  | 0.00 | 1.70 | D3 | 1.50 | −0.25 | 0.8 | 1.2 |
|  | 1.75 | 0.5 | 0.7 | −1.00 | 0.95 | −0.25 | 1.70 | D4 | 1.75 | 0.00 | 0.6 | 1.5 |
|  |  |  |  |  |  | −0.75 | 1.20 | D5 | 1.75 | 0.00 | 0.8 | 2.0 |
|  |  |  |  |  |  | 0.00 | 1.95 | D6 | 1.75 | −0.25 | 1.0 | 2.0 |
|  | 2 | 1 | 1.2 | −4 | −1.8 | −0.5 | 1.7 | D7 | 2.00 | 0.50 | 0.6 | 1.5 |
|  | 2.25 | 1 | 1.2 | −10 | −7.55 | −0.25 | 2.20 | D8 | 2.25 | 0.75 | 0.6 | 1.0 |
|  | 2.5 | 1 | 1.2 | −4 | −1.3 | −0.75 | 1.95 | D9 | 2.50 | 0.75 | 0.5 | 1.2 |
|  | 2.75 | 1 | 1.2 | −20 | −17.05 | −0.75 | 2.2 | D10 | 2.75 | 1.50 | 0.5 | 1.2 |
|  | 3.00 | 1 | 1.2 | −3.50 | −0.30 | 0.00 | 3.20 | D11 | 3.00 | 0.75 | 0.06 | 0.80 |
|  | 3.25 | 1 | 1.2 | −10 | −6.55 | −0.25 | 3.20 | D12 | 3.25 | 2.00 | 0.5 | 1.0 |
|  | 3.5 | 2 | 2.2 | −1 | 2.70 | 0.00 | 3.70 | D13 | 3.50 | 2.25 | 0.4 | 1.0 |
|  | 3.75 | 2 | 2.2 | −1.75 | 2.20 | −0.5 | 3.45 | D14 | 3.75 | 2.50 | 0.5 | 0.8 |
|  | 4.00 | 3 | 3.2 | −3.00 | 1.2 | 0.00 | 4.20 | D15 | 4.00 | 1.00 | 0.08 | 0.30 |
|  | 4.25 | 3 | 3.2 | −1 | 3.45 | −0.25 | 4.20 | D16 | 4.25 | 3.25 | 0.4 | 0.8 |
|  | 4.5 | 3 | 3.2 | −1.75 | 2.95 | −0.5 | 4.20 | D17 | 4.50 | 3.25 | 0.3 | 0.8 |
|  | 5.25 | 3 | 3.2 | −4 | 1.45 | −0.25 | 5.20 | D18 | 5.25 | 3.75 | 0.25 | 0.6 |

TABLE E

Table of hyperopic glasses for intermediate vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision After wear |
|---|---|---|---|---|---|---|---|---|---|---|---|---|
| 0.5 | 1.50 | 0.5 | 2.5 | −2.50 | 1.00 | −0.25 | 3.25 | E1 | 1.50 | 0.00 | 1.0 | 2.0 |
|  |  |  |  |  |  | −0.75 | 2.75 | E2 | 1.50 | 0.00 | 1.2 | 1.5 |
|  |  |  |  |  |  | 0.00 | 3.50 | E3 | 1.50 | −0.25 | 0.8 | 1.2 |
|  | 1.75 | 0.5 | 2.5 | −1.50 | 2.25 | −0.25 | 3.50 | E4 | 1.75 | 0.00 | 0.6 | 1.5 |
|  |  |  |  |  |  | −0.75 | 3.00 | E5 | 1.75 | 0.00 | 0.8 | 2.0 |
|  |  |  |  |  |  | 0.00 | 3.75 | E6 | 1.75 | −0.25 | 1.0 | 2.0 |
|  | 2 | 1 | 3 | −4 | 0 | −0.5 | 3.5 | E7 | 2.00 | 0.50 | 0.6 | 1.5 |
|  | 2.25 | 1 | 3 | −10 | −5.75 | −0.25 | 4.00 | E8 | 2.25 | 0.75 | 0.6 | 1.0 |
|  | 2.5 | 1 | 3 | −4 | 0.5 | −0.75 | 3.75 | E9 | 2.50 | 0.75 | 0.5 | 1.2 |
|  | 2.75 | 1 | 3 | −20 | −15.25 | 0 | 4.75 | E10 | 2.75 | 1.50 | 0.5 | 1.2 |
|  | 3.00 | 1 | 3 | −3.50 | 1.50 | 0.00 | 5.00 | E11 | 3.00 | 0.75 | 0.06 | 0.80 |
|  | 3.25 | 1 | 3 | −10 | −4.75 | −0.25 | 5.00 | E12 | 3.25 | 2.00 | 0.5 | 1.0 |
|  | 3.5 | 2 | 4 | −1 | 4.50 | −0.5 | 5.00 | E13 | 3.50 | 2.25 | 0.4 | 1.0 |
|  | 3.75 | 2 | 4 | −1.75 | 4.00 | 0.00 | 5.75 | E14 | 3.75 | 2.50 | 0.5 | 0.8 |
|  | 4.00 | 3 | 5 | −3.00 | 3.00 | 0.00 | 6.00 | E15 | 4.00 | 1.00 | 0.08 | 0.3 |
|  | 4.25 | 3 | 5 | −1 | 5.25 | −0.25 | 6.00 | E16 | 4.25 | 3.25 | 0.4 | 0.8 |
|  | 4.5 | 3 | 5 | −1.75 | 4.75 | 0.00 | 6.50 | E17 | 4.50 | 3.25 | 0.3 | 0.8 |
|  | 5.25 | 3 | 5 | −4 | 3.25 | −0.75 | 6.50 | E18 | 5.25 | 3.75 | 0.25 | 0.6 |

TABLE F

Table of hyperopic glasses for near vision and effect thereof

| U m | A D | $B_L$ D | $\Phi_L$ D | $B_M$ D | $\Phi_{SM}$ D | $B_S$ D | $\Phi_{SS}$ D | Lens No. | Diopter D before wear | Diopter D after wear | Vision before wear | Vision after wear |
|---|---|---|---|---|---|---|---|---|---|---|---|---|
| 0.33 | 1.50 | 0.5 | 3.5 | −3.00 | 1.5 | −0.25 | 4.28 | F1 | 1.50 | 0.00 | 1.0 | 2.0 |
|  |  |  |  |  |  | 0.00 | 4.53 | F2 | 1.50 | 0.00 | 1.2 | 1.5 |
|  |  |  |  |  |  | −0.75 | 3.78 | F3 | 1.50 | −0.25 | 0.8 | 1.2 |
|  | 1.75 | 0.5 | 3.5 | −1.00 | 3.75 | −0.25 | 4.53 | F4 | 1.75 | 0.00 | 0.6 | 1.5 |
|  |  |  |  |  |  | −0.50 | 4.28 | F5 | 1.75 | 0.00 | 0.8 | 2.0 |
|  |  |  |  |  |  | 0.00 | 4.78 | F6 | 1.75 | −0.25 | 1.0 | 2.0 |

TABLE F-continued

Table of hyperopic glasses for near vision and effect thereof

| U m | A D | $B_L$ D | $\Phi_L$ D | $B_M$ D | $\Phi_{SM}$ D | $B_S$ D | $\Phi_{SS}$ D | Lens No. | Effect example |||| 
|---|---|---|---|---|---|---|---|---|---|---|---|---|
| | | | | | | | | | Diopter D before wear | Diopter D after wear | Vision before wear | Vision after wear |
| | 2 | 1 | 4 | −4 | 1.03 | −0.5 | 4.53 | F7 | 2.00 | 0.50 | 0.6 | 1.5 |
| | 2.25 | 1 | 4 | −10 | −4.72 | −0.25 | 5.03 | F8 | 2.25 | 0.75 | 0.6 | 1.0 |
| | 2.50 | 1 | 4 | −4 | 1.53 | −0.75 | 4.78 | F9 | 2.50 | 0.75 | 0.5 | 1.2 |
| | 2.75 | 1 | 4 | −20 | −14.22 | 0.00 | 5.78 | F10 | 2.75 | 1.50 | 0.5 | 1.2 |
| | 3.00 | 1 | 4 | −3.50 | 2.50 | 0.00 | 6.00 | F11 | 3.00 | 0.75 | 0.06 | 0.80 |
| | 3.25 | 1 | 4 | −10 | −3.72 | −0.25 | 6.03 | F12 | 3.25 | 2.00 | 0.5 | 1.0 |
| | 3.5 | 2 | 5 | −1 | 5.53 | −0.5 | 6.03 | F13 | 3.50 | 2.25 | 0.4 | 1.0 |
| | 3.75 | 2 | 5 | −1.75 | 5.03 | −0.75 | 6.03 | F14 | 3.75 | 2.50 | 0.5 | 0.8 |
| | 4.00 | 3 | 6 | −3.00 | 4.00 | 0.00 | 7.00 | F15 | 4.00 | 1.00 | 0.08 | 0.30 |
| | 4.25 | 3 | 6 | −1 | 6.28 | −0.25 | 7.03 | F16 | 4.25 | 3.25 | 0.4 | 0.8 |
| | 4.5 | 3 | 6 | −1.75 | 5.78 | −0.75 | 6.78 | F17 | 4.50 | 3.25 | 0.3 | 0.8 |
| | 5.25 | 3 | 6 | −4 | 4.28 | −0.25 | 8.03 | F18 | 5.25 | 3.75 | 0.25 | 0.6 |

TABLE G

Preventive glasses for intermediate vision and effect thereof

| U m | A D | $B_L$ D | $\Phi_L$ D | $B_M$ D | $\Phi_{SM}$ D | $B_S$ D | $\Phi_{SS}$ D | Lens No. | Effect example |||| 
|---|---|---|---|---|---|---|---|---|---|---|---|---|
| | | | | | | | | | Diopter D before wear | Diopter D after wear | Vision before wear | Vision after wear |
| 0.5 | 0.25 | 0.2 | 2.2 | 1.00 | 3.25 | 0.25 | 2.50 | G1 | 0.25 | 0.00 | 1.2 | 2.0 |
| | | | | | | 0.5 | 2.75 | G2 | 0.25 | 0.50 | 1.5 | 1.5 |
| | | | | | | 0.00 | 2.25 | G3 | 0.25 | 0.00 | 1.0 | 2.0 |
| | 0.00 | 3 | 5 | 3.50 | 5.50 | 0.25 | 2.25 | G4 | 0.00 | 0.00 | 1.5 | 2.0 |
| | | | | | | 0.50 | 2.50 | G5 | 0.00 | 0.25 | 2.0 | 2.0 |
| | | | | | | 0.00 | 2.00 | G6 | 0.00 | 0.00 | 2.0 | 2.0 |
| | −0.25 | 3 | 5 | 1.75 | 3.5 | 0.25 | 2.00 | G7 | −0.25 | 0.00 | 1.5 | 2.0 |
| | | | | | | 0.75 | 2.50 | G8 | −0.25 | −0.25 | 1.5 | 2.0 |
| | | | | | | 0.00 | 1.75 | G9 | −0.25 | 0.00 | 2.0 | 2.0 |

TABLE H

Preventive glasses for near vision and effect thereof

| U m | A D | $B_L$ D | $\Phi_L$ D | $B_M$ D | $\Phi_{SM}$ D | $B_S$ D | $\Phi_{SS}$ D | Lens No. | Effect example |||| 
|---|---|---|---|---|---|---|---|---|---|---|---|---|
| | | | | | | | | | Diopter D before wear | Diopter D after wear | Vision before wear | Vision after wear |
| 0.33 | 0.25 | 0.2 | 3.2 | 1.00 | 4.25 | 0.25 | 3.53 | H1 | 0.25 | 0.00 | 1.2 | 2.0 |
| | | | | | | 0.50 | 3.78 | H2 | 0.25 | 0.50 | 1.5 | 1.5 |
| | | | | | | 0.00 | 3.28 | H3 | 0.25 | 0.00 | 1.0 | 2.0 |
| | 0.00 | 3 | 6 | 1.50 | 4.5 | 0.25 | 3.28 | H4 | 0.00 | 0.00 | 1.5 | 2.0 |
| | | | | | | 0.00 | 3.03 | H5 | 0.00 | 0.25 | 2.0 | 2.0 |
| | | | | | | 0.50 | 3.53 | H6 | 0.00 | 0.00 | 2.0 | 2.0 |
| | −0.25 | 3 | 6 | 1.75 | 4.5 | 0.25 | 3.03 | H7 | −0.25 | 0.00 | 1.5 | 2.0 |
| | | | | | | 0.75 | 3.53 | H8 | −0.25 | −0.25 | 1.5 | 2.0 |
| | | | | | | 0.00 | 2.78 | H9 | −0.25 | 0.00 | 2.0 | 2.0 |

Annex 2: Case Tables

CASE TABLE 1

| | | | \multicolumn{2}{c|}{Myopic students (19 people)} | | | | |
|---|---|---|---|---|---|---|---|---|
| Name | Sex | Age | Right Original vision Original diopter | Left Original vision Original diopter | Lens Right | Lens Left | Right Vision after wear diopter after wear | Left Vision after wear diopter after wear |
| Guo XX | M | 10 | 0.12 −3.12 | 0.1 −3.00 | A32 C32 | A32 C32 | 1.0 −0.62 | 1.0 −0.5 |
| Dong XX | M | 9 | 0.2 −2.87 | 0.2 −2.87 | A29 C29 | A29 C29 | 1.2 −0.37 | 1.2 0.37 |
| Chen XX | M | 7 | 0.25 −2.25 | 0.2 −2.75 | A23 | A29 | 1.5 0 | 1.5 0 |
| Gao XX | F | 9 | 0.3 −2.62 | 0.3 −3.00 | A26 C26 | A32 C32 | 1.2 0 | 1.0 −0.50 |
| Gu XX | F | 9 | 0.12 −2.50 | 0.15 −2.75 | A26 C26 | A29 C29 | 1.0 0 | 1.0 0 |
| Liang XX | M | 12 | 0.08 −5.00 | 0.1 −4.25 | A57 C57 | A48 C48 | 0.5 − 1 −3.00 | 0.5 + 1 −2.50 |
| Liu XX | F | 11 | 0.25 −2.37 | 0.6 −1.37 | A23 C23 | A11 C11 | 1.5 0 | 1.5 0 |
| Su XX | M | 13 | 0.15 −3.25 | 0.15 −3.00 | A36 C36 | A32 C32 | 1.2 −0.50 | 1.2 −0.25 |
| Yuan XX | M | 6 | 0.4 −2.87 | 0.25 −3.00 | A29 | A32 | 1.5 0 | 1.2 −0.50 |
| Li XX | F | 12 | 0.5 −1.62 | 0.5 −1.25 | A14 C14 | A11 C11 | 1.5 −0.75 | 1.5 −1.00 |
| Guo XX | F | 7 | 0.4 Combined −2.87 | 0.2 Combined −3.00 | A29 | A32 | 0.8 Combined −0.12 | 0.6 −1.62 |
| Tian XX | F | 7.5 | 0.4 −1.50 | 0.5 −1.25 | A14 | A11 | 1.2 −0.75 | 1.2 −0.50 |
| Jia XX | M | 10 | D0.5 −7.75 | D0.6 −6.00 | A82 C82 | A69 C69 | D1.5 −4.25 | D1.5 −2.75 |
| Qi XX | M | | | | | | | |
| Du XX | M | 9 | 0.2 −1.37 | 0.25 −1.50 | A11 | A14 | 1.0 −0.58 | 1.0 −0.62 |
| Guan XX | M | 7 | 0.2 −1.37 | 0.15 −1.62 | A11 | A14 | 1.2 −0.75 | 1.2 −0.47 |
| Wang XX | M | 6.5 | 0.8 −1.87 | 0.6 −1.75 | A17 | A17 | 1.5 −0.65 | 1.5 −0.60 |
| Ma XX | F | 16 | 0.3 −2.25 | 0.4 −2.12 | A23 B23 C23 | A20 B20 C20 | 0.8 −2.00 | 0.8 −1.75 |
| | | 16 | 0.2 −2.87 | 0.3 −2.87 | A29 B29 C29 | A29 B29 C29 | 1.2 0 | 1.2 −0.25 |
| Li XX | F | 9 | 0.5 Combined −1.25 | 0.4 Combined −1.37 | A11 | A11 | 12 Combined −0.37 | 1.0 Combined −0.39 |

CASE TABLE 2

| | | | \multicolumn{2}{c|}{Hyperopic students (16 people)} | | | | |
|---|---|---|---|---|---|---|---|---|
| Name | Sex | Age | Right Original vision Original diopter | Left Original vision Original diopter | Lens Right | Lens Left | Right Vision after wear diopter after wear | Left Vision after wear diopter after wear |
| Wang XX | M | 16 | 0.6 2.00 | 0.8 2.25 | E7 | E8 | 1.5 0.50 | 1.5 0.75 |
| Li XX | M | 13 | 0.5 2.73 | 0.4 2.75 | D10 | D10 | 1.0 1.00 | 1.2 1.00 |
| Liu XX | M | 12 | 0.5 2.75 | 0.5 2.00 | D10 | D7 | 1.0 1.0 | 1.2 0.50 |
| Gao XX | F | 9 | 0.2 3.50 | 0.25 3.25 | F13 | F12 | 1.0 2.00 | 0.8 1.75 |
| Guo XX | F | 13 | 0.6 2.50 | 0.8 1.75 | D9 | D4 | 1.2 1.50 | 1.2 0.75 |
| Zhao XX | M | 15 | 0.8 2.00 | 1.0 1.75 | D7 | D4 | 1.2 1.00 | 1.5 0.75 |
| Liu XX | F | 15 | 0.8 2.75 | 1.0 2.75 | D10 | D10 | 1.0 1.75 | 1.0 1.75 |
| Xu | M | 12 | 0.12 | 0.15 | D11 | D11 | 1.0 | 1.50 |

CASE TABLE 2-continued

| Hyperopic students (16 people) | | | | | | | | |
|---|---|---|---|---|---|---|---|---|
| Name | Sex | Age | Right Original vision Original diopter | Left Original vision Original diopter | Lens Right | Lens Left | Right Vision after wear diopter after wear | Left Vision after wear diopter after wear |
| XX | | | 3.00 | 3.00 | | | 1.75 | 1.75 |
| Zhao | M | 11 | 0.2 | 0.3 | D13 | D12 | 0.8 | 1.0 |
| XX | | | 3.50 | 3.25 | | | 2.00 | 1.75 |
| Chen | F | 6 | 0.12 | 0.12 | D16 | D15 | 0.4 | 0.3 |
| XX | | | Combined 4.25 | Combined 4.00 | | | Combined 3.75 | Combined 3.75 |
| Liu | F | 8 | 0.2 | 0.2 | D14 | D15 | 0.5 | 0.5 |
| XX | | | 3.75 | 4.00 | | | 2.50 | 2.75 |
| Jin | M | 6 | 0.1 | 0.12 | D16 | D15 | 0.4 | 0.3 |
| XX | | | Combined 4.25 | Combined 4.00 | | | Combined 3.25 | Combined 3.00 |
| Zhou | F | 9 | 0.1 | 0.15 | D17 | D17 | 0.6 | 0.6 |
| XX | | | 4.50 | 4.50 | F17 | F17 | 3.00 | 3.00 |
| Zheng | F | 8 | 0.1 | 0.1 | D18 | D18 | 0.6 | 0.5 |
| XX | | | Combined 5.25 | Combined 5.25 | F18 | F18 | Combined 3.75 | Combined 3.75 |
| Cai | M | 12 | 0.25 | 0.2 | D11 | D12 | 1.0 | 1.0 |
| XX | | | 3.00 | 3.25 | | | 1.50 | 1.50 |
| Qian | M | 10 | 0.15 | 0.12 | D13 | D12 | 0.6 | 0.6 |
| XX | | | Combined 3.50 | Combined 3.25 | | | 2.5 | 2.25 |

CASE TABLE 3

| Students needing prophylaxis (13 people) | | | | | | | | |
|---|---|---|---|---|---|---|---|---|
| Name | Sex | Age | Right Original vision Original diopter | Left Original vision Original diopter | Lens Right | Lens Left | Right Vision after wear diopter after wear | Left Vision after wear diopter after wear |
| Su XX | M | 10 | 1.0 −0.25 | 1.0 −0.25 | H7 | H7 | 2.0 0 | 2.0 0 |
| Xu XX | M | 15 | 1.0 0.25 | 1.2 0.25 | G1H1 | G1H1 | 1.5 0 | 2.0 0 |
| Li XX | F | 6 | 1.0 0 | 0.8 0 | H4 | H4 | 2.0 0 | 1.5 0 |
| Li XX | F | 8 | 1.5 −0.25 | 1.2 0 | H7 | H4 | 2.0 0 | 2.0 0 |
| Tian XX | F | 12 | 1.5 −0.25 | 2.0 0 | H7 | H4 | 2.0 0 | 2.0 0 |
| Xiu XX | M | 13 | 1.2 0 | 1.5 0.25 | H4 | H1 | 1.5 0 | 2.0 0 |
| Zhang XX | M | 14 | 0.8 −0.25 | 0.8 −0.25 | G7H7 | G7H7 | 1.5 0 | 1.5 0 |
| Guo XX | M | 11 | 1.2 0.25 | 1.5 0 | H1 | H4 | 2.0 0 | 2.0 0 |
| Lu XX | M | 16 | 1.2 0 | 1.0 0.25 | G4 | G1 | 2.0 0 | 2.0 0 |
| Wang XX | M | 8 | 1.0 0 | 1.2 0 | H4 | H4 | 2.0 0 | 2.0 0 |
| Ma XX | F | 11 | 1.2 0 | 1.2 −0.25 | H4 | H7 | 2.0 0 | 2.0 0 |
| Shao XX | F | 7 | 1.2 0 | 1.5 0 | H4 | H4 | 2.0 0 | 2.0 0 |
| Dong XX | M | 12 | 1.0 0.25 | 1.2 −0.25 | H1 | H7 | 2.0 0 | 2.0 0 |
| Liu XX | M | 6 | 0.3 1.25 | 0.25 1.00 | NO | | | |
| Xu XX | F | 5 | 0.25 1.50 | 0.25 1.25 | NO | | | |
| Zhang XX | M | 7 | 0.3 1.00 | 0.4 0.75 | NO | | | |

CASE TABLE 3-continued

Students needing prophylaxis (13 people)

| Name | Sex | Age | Right Original vision Original diopter | Left Original vision Original diopter | Lens Right | Lens Left | Right Vision after wear diopter after wear | Left Vision after wear diopter after wear |
|---|---|---|---|---|---|---|---|---|
| Jiao XX | F | 6 | 0.5 0.75 | 0.4 1.00 | NO | | | |
| Huang XX | F | 7 | 0.8 0.50 | 0.6 0.75 | NO | | | |

The invention claimed is:

1. A multi-element lens of controlling defocus and eye diopter, comprising a large unit convex lens capable of generating large defocus, a small unit concave lens generating small defocus or focus through combination is combined on the large unit convex lens, or a small single lens generating small defocus or focus is separately provided on the large unit convex lens;

a diopter of the large unit convex lens conforms to the following formula M:

$\Phi_L = 1/U + B_L$, wherein, the unit of $\Phi_L$ is D; U is the distance from the lens to the object, $U \geq 0.15$, and its unit is m; $B_L$ is large defocus degree, its unit is D and $0 < B_L \leq 20D$;

the diopter after combination of the large unit convex lens and the small unit concave lens or the diopter of the small single lens conforms to the following formula N:

$\Phi_{P-CS}$ or $\Phi_{SS} = 1/U + A + B_S$, wherein, the unit of $\Phi_{P-CS}$ or $\Phi_{SS}$ is D; U is the same as the above; A is the diopter of eye when the person needing prophylaxis or treatment looks far; $B_S$ is small defocus degree and its unit is D;

a. in Formula N, A is a fully corrected diopter when a myope looks far, and is a negative value; $0 \leq B_S \leq 0.75D$;

b. or, in formula N, A is a fully corrected diopter when a hyperope looks far, and is a positive value; $0 \geq B_S \geq -0.75D$;

c. or, in formula N, A is a normal diopter value when the person needing prophylaxis looks far; $0 \leq B_S \leq 0.75D$;

wherein the large unit convex lens capable of generating large defocus covers or corresponds to an equatorial view region.

2. The multi-element lens of controlling defocus and eye diopter according to claim 1, wherein on the large unit convex lens, a subunit concave lens generating medium defocus through combination with the large unit convex lens is also provided, or a medium single lens generating medium defocus is provided; the diopter after combination of the large unit convex lens and the subunit concave lens or the diopter of the medium single lens conforms to the following Formula P:

$\Phi_{P-CM}$ or $\Phi_{SM} = 1/U + A + B_M$, wherein, the unit of $\Phi_{P-CM}$ or $\Phi_{SM}$ is D; U is same as the above; A is the diopter of eye when the person needing prophylaxis or treatment looks far, and $B_M$ is medium defocus degree;

a. in Formula P, A is a fully corrected diopter when a myope looks far, and is a negative value; $0.75D < B_M \leq 20D$;

b. or, in Formula P, A is a fully corrected diopter when a hyperope looks far, and is a positive value; $-0.75D > B_M \geq -20D$;

c. or, in Formula P, A is the normal diopter value when the person needing prophylaxis looks far; $0.75D < B_M \leq 20D$.

3. The multi-element lens for controlling defocus and eye diopter according to claim 1, wherein U=5 m, U=0.5 m or U=0.33 m.

4. The multi-element lens for controlling defocus and eye diopter according to claim 1, wherein the junction between the large unit convex lens and the small unit concave lens or the small single lens is a gadual zoom structure or step zoom structure.

5. The multi-element lens for controlling defocus and eye diopter according to claim 2, wherein the subunit concave lens or the medium single lens is disposed on an outer ring of the small unit concave lens or the small single lens (3).

6. The multi-element lens for controlling defocus and eye diopter according to claim 5, wherein the junctions between the small unit concave lens or the small single lens, the subunit concave lens or the medium single lens and the large unit convex lens are gradual zoom structure or step zoom structure.

7. Application of the multi-element lens of controlling defocus and eye diopter according to claim 1, wherein, the multi-element lens is used in an ocular of a Galileo telescope, frame-type glasses, contact lens, clip-type hang glasses, therapeutic glasses (device), desktop type read-write glasses, ocular of a reading telescope, table mounted mirror or glasses with a controllable sight distance, or an ocular of a Galileo telescope which is used to substitute an ocular of a reading telescope.

* * * * *